United States Patent
Ergen

(10) Patent No.: US 11,570,636 B2
(45) Date of Patent: Jan. 31, 2023

(54) OPTIMIZING UTILIZATION AND PERFORMANCE OF WI-FI NETWORKS

(71) Applicant: Ambeent Inc., Yuba City, CA (US)

(72) Inventor: Mustafa Ergen, Istanbul (TR)

(73) Assignee: Ambeent Inc., Yuba City, CA (US)

( * ) Notice: Subject to any disclaimer, the term of this patent is extended or adjusted under 35 U.S.C. 154(b) by 0 days.

(21) Appl. No.: 17/360,187

(22) Filed: Jun. 28, 2021

(65) Prior Publication Data

US 2021/0409976 A1 Dec. 30, 2021

Related U.S. Application Data

(60) Provisional application No. 63/045,119, filed on Jun. 28, 2020.

(51) Int. Cl.
*H04W 4/00* (2018.01)
*H04W 24/02* (2009.01)
(Continued)

(52) U.S. Cl.
CPC ........... *H04W 24/02* (2013.01); *H04W 24/08* (2013.01); *H04W 72/0453* (2013.01); *H04W 72/082* (2013.01); *H04W 84/12* (2013.01)

(58) Field of Classification Search
CPC . H04W 24/02; H04W 24/08; H04W 72/0453; H04W 72/082; H04W 84/12
See application file for complete search history.

(56) References Cited

U.S. PATENT DOCUMENTS

| | | | | |
|---|---|---|---|---|
| 10,602,383 | B1 * | 3/2020 | Horton | .................. H04L 41/145 |
| 2010/0130189 | A1 * | 5/2010 | Morrison | ................ H04L 1/203 |
| | | | | 455/422.1 |

(Continued)

FOREIGN PATENT DOCUMENTS

| | | | | |
|---|---|---|---|---|
| EP | 3110230 A1 | * | 12/2016 | ........... H04B 1/3822 |
| WO | WO-2020081198 A1 | * | 4/2020 | ......... H04L 41/0663 |
| WO | WO-2021254592 A1 | * | 12/2021 | |

OTHER PUBLICATIONS

A.M. Koushik; Fei Hu; Sunil Kumar; "Deep Q—Learning-Based Node Positioning for Throughput-Optimal Communications in Dynamic UAV Swarm Network"; IEEE Transactions on Cognitive Communications and Networking. (Year: 2019).*

(Continued)

*Primary Examiner* — Thai D Hoang
(74) *Attorney, Agent, or Firm* — Chip Law Group

(57) ABSTRACT

Provided is a method and system for optimizing utilization and performance of a Wi-Fi network for one or more subscriber client devices through a Wi-Fi console application by monitoring an RF environment of the Wi-Fi network to detect interference to a subscriber client device from one or more neighboring client devices that include non-subscriber client devices and other subscriber client devices and allocating a spectrum/channel for the subscriber client device to access the Wi-Fi network using an AI model based on the interference detected, throughput requirements of applications running on the subscriber client device and importance/priority of an activity on the subscriber client device. The AI model constructs a relational aggregated graph and decompose the relational aggregated graph into dynamic clusters. A heuristic deep-learning method is applied to analyze the dynamic clusters to reduce a computation time for recommendation of a suitable spectrum/channel for accessing the Wi-Fi network.

42 Claims, 10 Drawing Sheets

(51) Int. Cl.
    *H04W 24/08*     (2009.01)
    *H04W 72/08*     (2009.01)
    *H04W 72/04*     (2009.01)
    *H04W 84/12*     (2009.01)

(56) References Cited

U.S. PATENT DOCUMENTS

| | | |
|---|---|---|
| 2017/0188241 A1 | 6/2017 | Mueck et al. |
| 2018/0338315 A1 | 11/2018 | Chen et al. |
| 2019/0215842 A1 | 7/2019 | Silverman et al. |
| 2019/0244135 A1* | 8/2019 | Melamed ............... G06N 20/00 |
| 2020/0028804 A1 | 1/2020 | Ergen |
| 2020/0084777 A1 | 3/2020 | Ergen |
| 2020/0142388 A1* | 5/2020 | Maggiore ............. H04W 4/029 |
| 2020/0184787 A1 | 6/2020 | Emmanuel et al. |
| 2020/0219386 A1* | 7/2020 | El Assaad ............ G08G 1/0133 |
| 2022/0012637 A1* | 1/2022 | Rezazadegan Tavakoli ................ G06N 3/088 |
| 2022/0038349 A1* | 2/2022 | Li ...................... H04B 17/3913 |

OTHER PUBLICATIONS

International Search Report and Written Opinion in PCT/US2021/039321 dated Oct. 1, 2021.

\* cited by examiner

OPTIMIZING UTILIZATION AND PERFORMANCE OF WI-FI NETWORKS

CROSS-REFERENCE TO RELATED APPLICATIONS/INCORPORATION BY REFERENCE

This application claims priority to, and benefit from U.S. Provisional Application Ser. No. 63/045,119, filed on Jun. 28, 2020, entitled "Wi-Fi Console: A Step for Global Orchestration of the Spectrum", the entire content of which is hereby incorporated herein by reference in its entirety.

FIELD

Various embodiments of the present disclosure generally relate to communication in Wireless-Fidelity (Wi-Fi) networks. Specifically, the present disclosure relates to a method and system for optimizing utilization and performance of Wi-Fi networks for subscriber client devices.

BACKGROUND

Millions of people around the globe require fast and reliable broadband for work, education, socialization, and entertainment. Managing the quality of broadband experience in the home is more than ever a priority for service providers, and Wi-Fi is at the centerstage of that effort. Therefore, a very solid Wi-Fi foundation is much required.

Wi-Fi utilizes unlicensed spectrum that is of great economic value to society, but it comes at the price of uncertain performance. Unlicensed spectrum is small sections of the radio spectrum in which anybody can transmit, up to a limit in power, without needing to apply (or usually pay) for a radio operator's license of which Wi-Fi is a classic incumbent. Two bands have been allocated at 2.4 GHz and 5 GHz in which anyone can transmit at no more than 1 watt of power. Wi-Fi can operate well as long as everybody observes the rules. However, given the free and decentralized nature of unlicensed spectrum, multiple issues may arise and affect the overall performance of the system. Further, the use of unlicensed spectrum is subject to interference, coverage issues, and poor performance. Generally, operations in unlicensed bands lack visibility and is therefore hard to manage or prevent issues as users or operators do not know what to look for. As an example, neighbor interference is one of the drawbacks of operating in unlicensed mode and the mix of devices operating in this environment degrades the performance for users. Often, neighbors end up using the same channel creating an unavoidable congestion.

In erstwhile techniques, the main approach to solving the issues with indoor Wi-Fi performance has been driven by the integration of additional software in the middleware gateway to address the issues of coverage and congestion. However, this approach has fallen short of operators' needs as they must deal with a complex and diverse footprint of access points (APs). Hence, time-to-market is severely long and not scalable.

While 5G supports unlicensed and shared spectrum, Wi-Fi has been moving in the other direction, taking on many characteristics of cellular technologies such as enhanced Quality of Service (QoS), security and Automatic Frequency Selection (AFS). As the lines between licensed and unlicensed spectrum blur, Wi-Fi will evolve alongside cellular networks and be a part of the broader 5G platform, bringing 5G-like capabilities to non-spectrum owners (specifically, cable operators, city authorities, or private network providers, among others). In view of this, network operators are looking for ways to become more agile in order to compete, and as functions are becoming virtualized, consumers must be able to select their own 5G applications on demand. Further, in the near future, the industry will start locking down 6G technologies, where spectrum agility will form the basis of the standard.

Furthermore, with the proliferation of Wi-Fi devices and their usage, and with Wi-Fi 6 allowing wider channels, the Wi-Fi community is looking for ways to better manage spectrum usage to maintain high Quality of Experience (QoE), especially in increasing gigabit speeds by Fiber-To-The-Home (FTTH) or Data Over Cable Service Interface Specifications (DOCSIS) 3.1.

In the 2.4 GHz band, 1, 6, and 11 are the only non-overlapping channels. Selecting one or more of these channels is an important part of a correct set-up of a home network. Currently, many wireless routers automatically select the channel upon the initial setup where, depending on the specific wireless environment, it may lead to decrease in Wi-Fi speeds and interference. The 2.4 GHz band is divided into fourteen overlapping channels spaced 5 MHz apart and eleven overlapping channels. While older-generation access points that support only 2.4 GHz are becoming increasingly less common, they are still deployed and can cause issues for operators, that is, their residential customers can experience a high level of interference and quality issues. Specifically, the 2.4 GHz is reported to be "polluted" by noise coming from all kinds of non-Wi-Fi devices, such as, but not limited to, microwave ovens, cordless phones, and printers. Therefore, users are encouraged to upgrade to dual band 2.4 and 5 GHz access points, where 2.4 GHz would mainly be used to expand the coverage.

The 6 GHz band is currently set aside for licensed users, including carriers and Mobile Virtual Network Operators (MVNOs) who have deployed thousands of point-to-point microwave links to backhaul network traffic. Lightweight management of spectrum usage in the band through a spectrum controller is required to allow unlicensed and licensed users to co-exist, maximizing spectral efficiency.

Further, in order to protect the incumbent operators in the 6 GHz, that is, microwave links from MNOs, utilities, public safety, and transportation, as well as broadcast auxiliary service and cable television relay service, the Federal Communications Commission (FCC) requires the use of an AFS system. Unlicensed use of the 5925-6425 MHz and 6525-6875 MHz sub-bands will be subject to control by an Automated Frequency Coordination (AFC) system, while unlicensed use of the other two sub-segments tentatively is proposed to be limited to lower-power and indoor-only use without the need for database coordination. Because the incumbent services in U-NII-5 and U-NII-7 bands are fixed, the FCC proposes to allow unlicensed use at standard power outdoors and indoors subject to an AFC system. The agency "envision[s] the AFC system to be a simple database that is easy to implement." AFC exists primarily for outdoor applications but will also apply for higher power indoor usage such as in large warehouses or residential multi-dwelling units. APs will require a geolocation technology and some way to communicate to the AFC outside of the protected bands. The AFC will be required for indoor higher-power operation above Low Power Indoor (LPI) limits and indoor higher-power mobile clients.

Incumbent Point-to-Point microwave links and Flight Service Station (FSS) earth stations are fixed, highly directional, and seldom change location or operating parameters.

Like the TV Bands Database, the AFC "System Operator" is simply enforcing protection zones around static incumbent links based on incumbent-provided licensing data that will be continually updated. A grant to operate a Wi-Fi access point at a location is therefore a one-to-one calculation that is easily verified based on incumbent data. The AFC system operator regularly updates information on incumbent receivers stored in databases maintained by the FCC, which it will use to automatically calculate and enforce protection contours sufficient to protect Point-to-Point links, denying requests to operate where the Radio Local Area Network's (LAN's) emissions exceed an interference threshold into any individual incumbent link. AFC allows incumbent services to add sites or modify their networks, since FCC databases continue to be updated by incumbents, and Radio LAN channel permissions expire automatically if not renewed within a period provided in the FCC's rules.

Furthermore, Wi-Fi is the most used technology to connect indoors, both in the home, the office and even in public spaces such as shopping malls. When Wi-Fi performance is compromised, users become frustrated and look for ways to fix the problem. Wi-Fi experience can vary a lot and be subject to many environmental factors, such as, but not limited to, congestion, noise, and interference. Typically, users and even the operators themselves are unable to identify the sources of poor Wi-Fi performance. Top factors affecting Wi-Fi performance may include, but are not limited to, poor Customer Premise Equipment (CPE) placement, neighbor interference, dead zones due to the layout of the home, and presence of too many legacy devices operating exclusively at 2.4 GHz. Wi-Fi experience is plagued with unknown knowns (that is, "things we understand but are not aware of,") such as, but not limited to, signal strength, neighbor interference, loads of connected devices, and interference from non-802.11 devices.

Further, when a device stops working, a user searches for the problem online or calls a helpline/call center. Most online resources are not direct and sometimes the issue is complex which requires the user to still call the helpline. However, the user often gets frustrated with the call centers' script, as technical personnel are coming in blind, to try and fix the problem. Sometimes the call center operators/technicians still cannot find the problem, either requiring the user to ship the item back for inspection or send a technician to the user's home. In most cases, issues arise due to Internet connectivity rather than device malfunctioning.

There are hundreds of gateways, access points, set-top boxes, and modems from dozens of vendors encompassing various generations of Wi-Fi, which make the job of consolidating all these devices virtually impossible for a given operator. Further, with the emergence of new technologies such as, but not limited to, Internet-of-Things (IoT), the complexity of CPE is increasing, thereby increasing the probability of software malfunction and leading to the requirement of harder testing and an increase in time-to-market. This creates a hassle for operators as they look to deploy new services and features on top of such a disparate footprint and further limits operators, who have to deal with ten and twenty models of gateways from different vendors in their broadband network, as to what speed they can scale their new deployments.

Furthermore, performance of an 802.11 network degrades when some stations use a lower data rate than the others. This is common in a network environment since there is wide variety of Wi-Fi AP generations in use and the adaptation mechanisms that clients utilize to select a data rate. If the link to the destination is under severe fading and interference, an adaptation mechanism reduces the rate by changing its modulation scheme. Data rate adaptation mechanisms are proprietary and may consider successfully received ACKs or signal-to-noise ratio (SNR). The reason why throughput degrades is hidden under the basic Carrier-Sense Multiple Access with Collision Avoidance (CSMA/CA) channel access method, easy to view from a Markov model. If a station acquires the transmission opportunity, the station uses it as long as it is needed. As a result, if a station operates with a lower data rate, airtime used is longer than needed with the same payload. Hence, the channel is not used optimally, reducing the overall performance of the network.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A method and system for optimizing utilization and performance of Wi-Fi networks is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed method and system for optimizing utilization and performance of a Wi-Fi network for one or more subscriber client devices using a Wi-Fi console application that communicates with a central node deployed on a cloud platform using a cloud processor. A subscriber client device accesses the Wi-Fi network through a Wi-Fi access point operating on a channel. The Wi-Fi console application is configured to monitor an RF environment of the Wi-Fi network to detect interference to a subscriber client device from one or more neighboring client devices accessing a same channel as the subscriber client device based on the monitoring of the RF environment. The one or more neighboring client devices include one or more non-subscriber client devices and/or one or more other subscriber client devices. A spectrum/channel is then allocated for the subscriber client device to access the Wi-Fi network using an AI model based on the interference detected, throughput requirements of one or more applications running on the subscriber client device and importance/priority of an activity of an end-user on the subscriber client device. The AI model is configured to construct a relational aggregated graph that indicates relationships between Wi-Fi access points and relationships between Wi-Fi access points and the one or more subscriber client devices and decompose the relational aggregated graph into dynamic clusters. A heuristic deep-learning method of the AI model is applied to analyze the dynamic clusters to reduce a computation time for recommendation of a suitable spectrum/channel for the Wi-Fi network.

Figure 1:
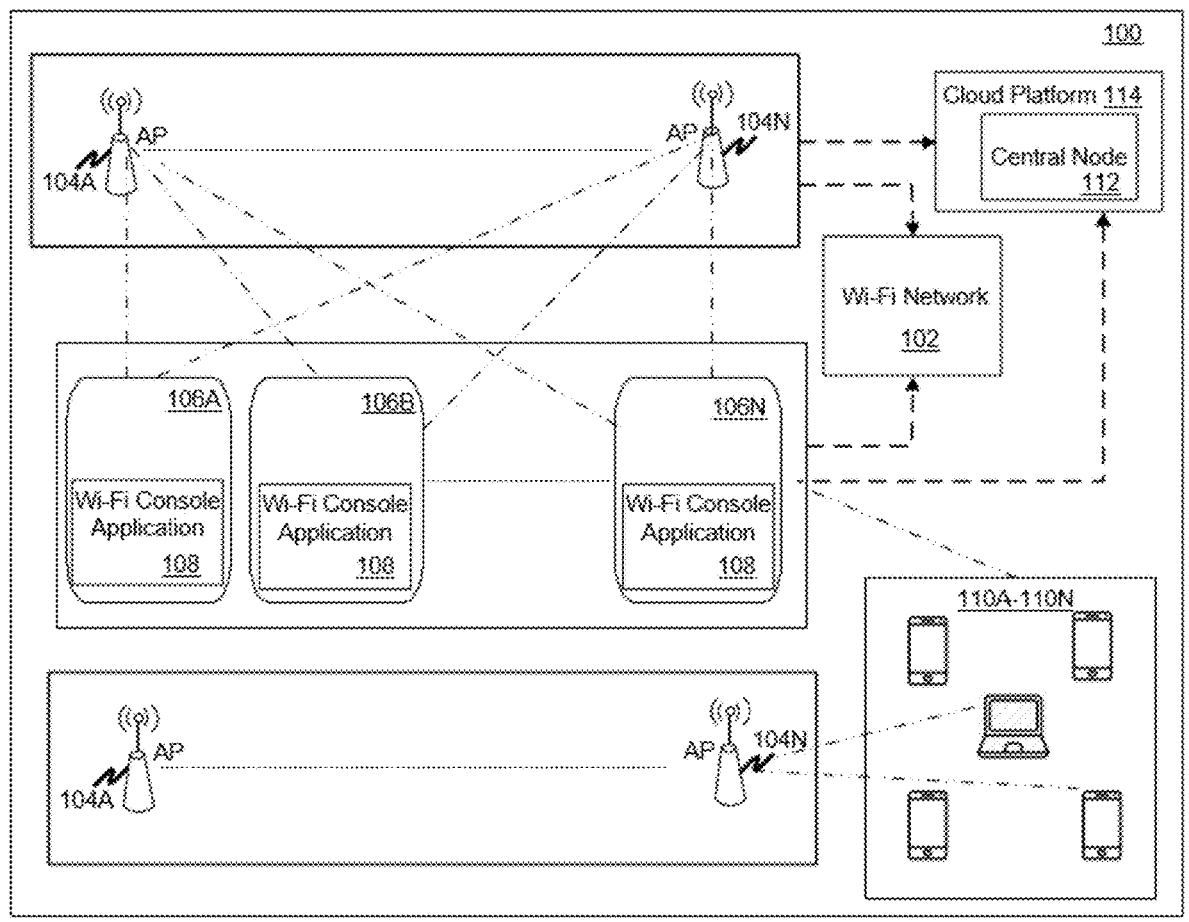
FIG. 1 is a diagram that illustrates a system for optimizing utilization and performance of a Wi-Fi network in accordance with an exemplary embodiment of the disclosure.

FIG. 1 is a diagram that illustrates a system for optimizing utilization and performance of a Wi-Fi network in accordance with an exemplary embodiment of the disclosure. Referring to FIG. 1, there is shown a system 100, which includes a Wi-Fi network 102, a plurality of Wi-Fi access points 104A-104N, one or more subscriber client devices 106A-106N, a Wi-Fi console application 108 running on each subscriber client device of the one or more subscriber client devices 106A-106N, one or more non-subscriber client devices 110A-110N, a central node 112 deployed on a cloud platform 114.

The Wi-Fi network 102 is a wireless network that may comprise suitable logic, circuitry, interfaces and/or code that may be operable to connect the plurality of Wi-Fi access points 104A-104N and the one or more subscriber client devices 106A-106N using wireless radio signals.

The plurality of Wi-Fi access points 104A-104N are wireless access points (APs) that may comprise suitable logic, circuitry, interfaces and/or code that may be operable to allow client devices to connect to a wired network. The client devices connect to their respective Wi-Fi networks through Wi-Fi access points operating on a specific channel.

The one or more subscriber client devices 106A-106N are computing devices that have subscribed to the Wi-Fi network 102. The one or more subscriber client devices 106A-106N may comprise suitable logic, circuitry, interfaces and/or code that may be operable to communicate data or messages with one or more other client devices and transmit radio frequency signals when attempting to access local wireless networks. The one or more subscriber client devices 106A-106N may comprise wireless-enabled devices that may include, but are not limited to, personal computers (PCs), mobile devices, smart phones, laptops, printers, personal digital assistants (PDAs), multimedia tablets, and phablets.

The one or more non-subscriber client devices 110A-110N are computing devices that have not subscribed to the Wi-Fi network 102 and may operating on other different Wi-Fi networks. The one or more non-subscriber client devices 110A-110N may comprise suitable logic, circuitry, interfaces and/or code that may be operable to communicate data or messages with other computing devices and transmit radio frequency signals when attempting to access local wireless networks. The one or more non-subscriber client devices 110A-110N may comprise wireless-enabled devices that may include, but are not limited to, PCs, mobile devices, smart phones, laptops, printers, PDAs, multimedia tablets, and phablets.

The Wi-Fi console application 108 comprises suitable logic and/or interfaces that, when executed by a processor, communicates with the central node 112 deployed on the cloud platform 114. The Wi-Fi console application 108 may be configured as a subscriber client device application to be installed on the one or more subscriber client devices 106A-106N for optimizing utilization and performance of the Wi-Fi network 102.

The Wi-Fi console application 108 may be activated easily for home, enterprise, telco and over-the-top (OTT) customers. Once a user has signed up, a group code is generated and used to link devices. This code is entered into subscriber client device applications (apps) in order to link the data coming from a subscriber client device to a specific console. A subscriber client device can either download the Wi-Fi console application 108 through a Software Development Kit (SDK) or through app stores on respective subscriber client devices.

In accordance with an embodiment, the Wi-Fi console application 108 may be configured as an Artificial Intelligence (AI)-centric mobile app or an SDK for Internet Service Providers (ISPs). The Wi-Fi console application 108 is configured to gather and analyze smart data to enable proactive and real-time optimization facilities for end-users, enterprises and ISPs in collaboration with a cloud processor of the cloud platform 114. The SDK is configured to collect relevant data not only through its mobile app, but also over routers deployed indoors/outdoors and neighboring devices, scanning Radio Frequency (RF) channels in monitoring mode. Thus, the Wi-Fi console application 108 is configured to allow end-users or customers analyze characteristics and behaviors of Wi-Fi users and their online devices making use of detailed datasets. The Wi-Fi console application 108 is further configured to provide end-users with a deep knowledge and feedback related to Wi-Fi environment of homes/offices, for instance, a single home, a local or regional group of homes/offices, and enable the end-users to add an essential value to their ecosystem.

Further, the Wi-Fi console application 108 may be configured to be decentralized through either a push mechanism or by integrating the Wi-Fi console application 108 on another existing operator application on a subscriber client device, to enable any operator to deploy functionalities of the Wi-Fi console application 108 without delays and regardless of how fragmented and complex their access point footprint is.

In operation, the Wi-Fi console application 108 may be configured to monitor an RF environment of the Wi-Fi network 102 to detect interference to a subscriber client device 106A from one or more neighboring client devices accessing a same channel as the subscriber client device. The one or more neighboring client devices may include the one or more non-subscriber client devices 110A-110N and one or more other subscriber client devices. The Wi-Fi console application 108 is further configured to allocate a spectrum/channel for the subscriber device 106A to access the Wi-Fi network 102, utilizing an AI model, based on the interference detected from the one or more neighboring client devices, throughput requirements of one or more applications running on the subscriber client device 106A and importance and/or priority of an activity of an end-user on the subscriber client device 106A. The Wi-Fi console application 108, using the AI model, is configured to construct a relational aggregated graph, which indicates relationships between Wi-Fi access points and relationships between Wi-Fi access points and the one or more subscriber client devices 106A-106N. Using an AI-based solver of the AI model, the Wi-Fi console application 108 is configured to decompose the relational aggregated graph into dynamic clusters, and apply a heuristic deep-learning method to analyze the dynamic clusters to reduce a computation time for recommendation of the spectrum/channel for the Wi-Fi network 102. Various parameters of the Wi-Fi console application 108 are further monitored, analyzed and manipulated through the cloud processor of the cloud platform 114.

Figure 2:
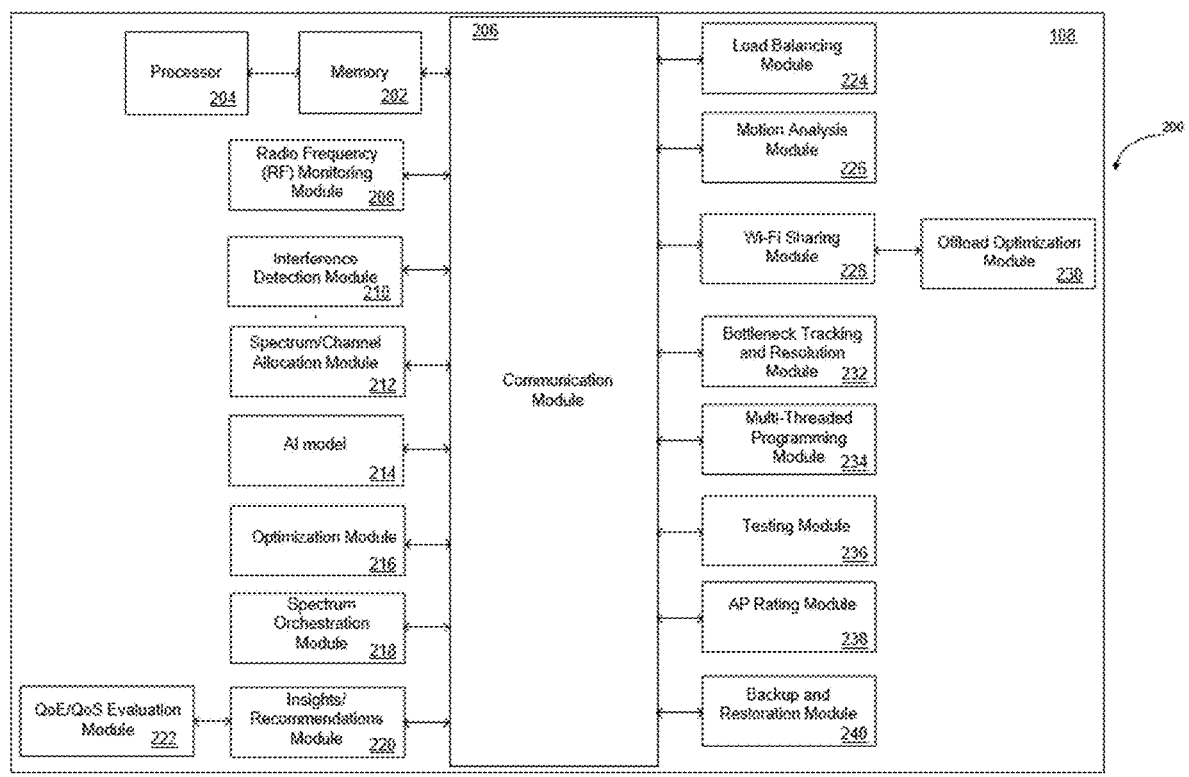
FIG. 2 is a diagram that illustrates a system of a Wi-Fi console application for optimizing utilization and performance of a Wi-Fi network for one or more subscriber client devices in accordance with an exemplary embodiment of the disclosure.

FIG. 2 is a diagram that illustrates a system of a Wi-Fi console application for optimizing utilization and performance of a Wi-Fi network for one or more subscriber client devices in accordance with an exemplary embodiment of the disclosure. Referring to FIG. 2, there is shown a system 200, which includes the Wi-Fi console application 108 which further includes a memory 202, a processor 204, a communication module 206, an RF monitoring module 208, an interference detection module 210, a spectrum/channel allocation module 212, an AI model 214, an optimization module 216, a spectrum orchestration module 218, an insights/recommendations module 220, a QoE/QoS evaluation module 222, a load balancing module 224, a motion analysis module 226, a Wi-Fi sharing module 228, an offload optimization module 230, a bottleneck tracking and resolution module 232, a multi-threaded programming module 234, a testing module 236, an AP rating module 238, and a backup and restoration module 240.

The memory 202 may comprise suitable logic, and/or interfaces, that may be configured to store instructions (for example, computer readable program code) that can implement various aspects of the present disclosure.

The processor 204 may comprise suitable logic, interfaces, and/or code that may be configured to execute the instructions stored in the memory 202 to implement various functionalities of the Wi-Fi console application 108 in accordance with various aspects of the present disclosure. The processor 204 may be further configured to communicate with various modules of the Wi-Fi console application 108 via the communication module 206.

The communication module 206 may comprise suitable logic, interfaces, and/or code that may be configured to transmit data between modules, engines, databases, memories, and other components of the Wi-Fi console application 108 for use in performing the functions discussed herein. The communication module 206 may include one or more communication types and utilizes various communication methods for communication within the Wi-Fi console application 108.

The RF monitoring module 208 may comprise suitable logic, interfaces, and/or code that may be configured to monitor an RF environment of the Wi-Fi network 102.

The interference detection module 210 may comprise suitable logic, interfaces, and/or code that may be configured to detect interference to the subscriber client device 106A from one or more neighboring client devices accessing a same channel as the subscriber client device 106A based on the monitoring of the RF environment by the RF monitoring module 208. The one or more neighboring client devices may include the one or more non-subscriber client devices 110A-110N and one or more other subscriber client devices.

In accordance with an embodiment, the interference detection module 210 is configured to perform channel scanning by the subscriber client device 106A by switching to each channel one by one and detecting one or more Wi-Fi access points operating on the same channel as the subscriber client device 106A, and determine the interference based on a formulation of signal-to-noise ratio (SNR) and signal-to-interference plus noise ratio (SINR) and compare the level of Wi-Fi signals from the one or more Wi-Fi access points to a level of interfering signals from the one or more neighboring client devices.

The spectrum/channel allocation module 212 may comprise suitable logic, interfaces, and/or code that may be configured to allocate a spectrum/channel using the AI model 214 for the subscriber client device 106A to access the Wi-Fi network 102.

The AI model 214 may comprise suitable logic, interfaces, and/or code that may be configured to enable the spectrum/channel allocation module 212 to allocate the spectrum/channel for the Wi-Fi network 102 based on the interference detected, throughput requirements of one or more applications running on the subscriber client device 106A and importance and/or priority of an activity of an end-user on the subscriber client device 106A.

For training the AI model 214, a cloud database on the cloud platform 114 is configured to receive and store measurements (RF measurements) from client devices in the Wi-Fi network 102. The measurements stored in the cloud database are transmitted to the cloud platform 114. At the cloud platform 114, data processing and multivariable statistics on the measurements are performed. AI training is then performed using the measurements stored in the cloud database and data computations received from the cloud platform 114. Trained AI parameters are then fed to the AI model 214 for calculation of optimal channels for a subscriber client device to access the Wi-Fi network 102 based on a set of criteria or parameters that may include, but are not limited to, throughput, jitter, end-to-end latency, coverage, packet loss rate, Received signal strength indicator (RSSI), and SINR. The AI algorithms of the AI model 214 replace the traditional integer programming optimization in real-time in order to reduce the computational load at high density networks. The AI algorithms are advanced supervised learning methods which require a representative set of data for the estimation of AI parameters (training) in order to be used for different scenarios. An input vector and a corresponding output vector is necessary in order to obtain the AI parameters. In this particular case, the training dataset of the AI model 214 is constructed from the measurements of client devices (STAs). Once the AI model 214 is trained, it is used to provide the operations for optimization, classification and prediction processes. In general, the main three steps of the AI process of the AI model 214 include: optimize, classify, and predict.

The optimization module 216 may comprise suitable logic, interfaces, and/or code that may be configured to construct a relational aggregated graph to enable the spectrum/channel allocation module 212 to allocate the spectrum/channel for the Wi-Fi network 102. The relational aggregated graph indicates relationships between Wi-Fi access points and relationships between Wi-Fi access points and the one or more subscriber client devices 106A-106N. An AI-based solver of the AI model 214 is configured to decompose the relational aggregated graph into dynamic clusters. The AI-based solver is further configured to apply a heuristic deep-learning method to analyze the dynamic clusters to reduce a computation time for providing fast-switching recommendations of a right spectrum/band or channel for the Wi-Fi network 102, for optimizing Wi-Fi access for the subscriber client device 106A.

The spectrum orchestration module 218 may comprise suitable logic, interfaces, and/or code that may be configured for high density Wi-Fi environments to increase connectivity of the one or more subscriber client devices 106A-106N as end-users move around. Dynamic and precise usage information collected from the one or more subscriber client devices 106A-106N allows for smart band/channel selection using the spectrum orchestration module 218 to minimize congestion and interference.

In accordance with an embodiment, the spectrum orchestration module 218 acts as a broker for a plurality of Wi-Fi networks, each Wi-Fi network of the plurality of Wi-Fi networks under a different ownership. The spectrum orchestration module 218 is configured to manage spectrum and transmit power allocation using a heat map constructed on a subscriber client device of an end-user based on information pertaining to one or more other subscriber client devices. Optimization algorithms in the spectrum orchestration module 218 are continuously adjusted based on an ever-changing environment bringing RF in an order over a chaotic and an unpredictable environment.

Shifting from a decentralized to a centralized management system on the unlicensed spectrum is critical to obtaining the maximum possible degree of efficiency and increasing overall wireless QoS. In order to address this, the spectrum orchestration module 218 is configured to enable an end-user to enjoy the benefits of smart allocation of channels, without having to resort to an operator's permission or involvement. This is a very low-cost entry which is self-driven by positive results.

The insights/recommendations module 220 may comprise suitable logic, interfaces, and/or code that may be configured to provide, using the AI model 214, one or more insights and/or recommendations to an end-user on a dashboard of a subscriber client device using appropriate Application Programming Interfaces (APIs) based on evaluating a QoE of the end-user using the QoE/QoS evaluation module 222.

The QoE/QoS evaluation module 222 may comprise suitable logic, interfaces, and/or code that may be configured to evaluate QoE of end-users or Wi-Fi subscribers and provide insights and AI-based recommendations on a dashboard of a subscriber client device.

The one or more insights and/or recommendations may include, but are not limited to, Wi-Fi coverage, suitable placement of Wi-Fi access points based on at least one of Received Signal Strength Indicator (RSSI) and/or interference from neighboring client devices to a subscriber client device, a number of end-users using the Wi-Fi network 102, throughput requirements of currently active applications on a subscriber client device, frequencies and locations of one or more blind spots, wherein a blind spot is a location in a building where it is not possible to connect to a Wi-Fi access point, or where a Wi-Fi access point can be connected to only at very low speeds, a view of how guest users engage with a Wi-Fi network, a number of end-users connected to a single Wi-Fi access point, the distribution of end-users between different Wi-Fi access points, and a specific area end-users connect from to a Wi-Fi access point. The Wi-Fi console application 108 also enables an end-user to define QoE objectives via a settings page on the dashboard of a subscriber client device of the end-user.

In accordance with an embodiment, the insights/recommendations module 220 is configured to provide various feedback related to home and office Wi-Fi networks which are as follows:

Device/User/Home-based coverage analysis: Coverage analysis indicates whether an end-user has shortage in Wi-Fi coverage or not. If there are coverage problems, ISPs can recommend to their end-users to obtain a mesh system, an extender or an update router.

Router (Wi-Fi AP) Placement: Router (Wi-Fi AP) placement demonstrates how well a router or a Customer Premise Equipment (CPE) receives its signal. This is an indicator for how well the router is placed based on the received signal strength (RSS) and provides information on the number of subscriber complaints stemming from inadequate AP placement. It can help a swift and successful installation of the home gateway or help subscribers and technicians find the best location for the AP. The insights/recommendations module 220 of the Wi-Fi console application 108 is configured to provide end-users with the optimized router placement within a home/office through dynamic channel scanning and ping tests. In this way, in-home Wi-Fi consumers are empowered to discover an optimal spot for their AP to receive the best signal strength possible.

Device-centric RSSI: Low RSS of Wi-Fi devices or client devices leads to increased packet loss rate, which also leads to higher back off durations and hence inefficient channel utilization. This may result in Wi-Fi devices to transmit/receive fewer packets.

Home/office-centric number of blind spots: The insights/recommendations module 220 is configured to provide end-users with frequencies and locations of in-home blind spots where it is not possible to connect to an AP, or where it can be connected to the AP but only at a very low speed. The Wi-Fi console application 108 is configured to monitor a Wi-Fi network environment of end-users including neighboring access points as well as physical movements of end-users in their home, to help the end-users discover an optimal spot for a Wi-Fi access point.

Measurements and statistics: The Wi-Fi console application 108 is configured to collect Wi-Fi data from the SDK, channel scanning and routers in the vicinity. In this way, various metrics are shared with end-users or customers that may include, but are not limited to, neighboring service set identifiers (SSIDs), speed test results, latency, packet loss rate, jitter, buffer rate, Central Processing Unit (CPU) and Random Access Memory (RAM) utilization, AP brands, and operating systems used.

Users' behaviors: The QoE/QoS evaluation module 222 is configured to examine an end-user's historical data and online behavior and accordingly provide high QoS/QoE for its end-users. The QoE/QoS evaluation module 222 is further configured to classify traffic as background and essential, and then provide prioritization to different end-users in order to increase Wi-Fi speed for its prioritized end-users/devices.

Historical data analysis: The insights/recommendations module 220 is configured to provide end-users with actionable insights for future network planning and resource optimization based on historical data analytics. The insights/recommendations module 220 is also configured to allow ISPs back up key historical end-user data on the cloud platform 114 regarding network/infrastructure elements for an easy analysis or a recovery following an incident.

Most preferred/connected servers: The insights/recommendations module 220 is further configured to log servers/Uniform Resource Locators (URLs) that end-users frequently connect to and report end-user preferences/behaviors back to them.

Average/time-specific number of hop counters: The 'hop count' refers to a number of intermediate network devices through which data must pass through between a source and destination. The hop count is a rough measure of distance between two hosts. This information may help end-users analyze their subscribers' prospective traffic and latency demands.

Average/time-specific number of connected/active users: Active users represent the number of devices that are active in a Wi-Fi network. This metric provides a high-level view of how crowded a Wi-Fi AP is at a given point in time or in the future with the implementation of AI or Machine Learning (ML).

Routers (AP) detected: Routers detected represents the number of neighboring SSIDs that the Wi-Fi console application 108 is configured to detect through the scanning of neighboring APs. This can be a good indicator of how busy the RF environment is (or will be) in a given area and a period of time and is used to predict future trends in the RF environment with the implementation of AI/ML.

Connected/unconnected devices (their brands, OS s) in home: The insights/recommendations module 220 is configured to provide information related to brands and models of devices deployed by end-users, and the devices that show a tendency for weak performance. Historical data on device information may be used for detailed analysis of device behavior.

End-user customization: The Wi-Fi console application 108 is configured to provide a dashboard that is customized to meet the strategic objectives of different users. Actionable insights may be generated for future network planning and resource optimization based on historical data analytics using the insights/recommendations module 220.

End-user/home-based data consumption statistics: The insights/recommendations module 220 is configured to provide end-users with information related to data usage of their devices. A handy mobile data calculator as part of the Wi-Fi console application 108 helps end-users work out how much data they used or would need, based on the apps they use the most, so that they can find a plan tailored to their needs.

End-user/home-based app and traffic type usage: The Wi-Fi console application 108 is configured to log different types of traffic flows such as data, voice and video, and their proportion to the total traffic consumption volume. This information may help end-users understand their customers' needs and traffic consumption behaviors.

End-user/home-based available bandwidth and supported data rate: The data rate provides the link layer rate, whereas bandwidth provides the theoretical value, that an end-user device is allowed to transmit data at a given instance. However, in the real world, there will be interference and losses which will result in a lower bit rate. The throughput is a practical value that the wireless link can achieve. This data is used to monitor and forecast data rates over time, which is useful to view and optimize bandwidth usage. It can help clients plan infrastructure needs with a view to minimize costs without compromising QoE. Similarly, real-time and proactive data rate monitoring can help ISPs offload data traffic (that is, between wireless and wired) with respect to peak hours towards increasing QoE.

Speed Tests from a device to specific servers: Speed Test measures the end-to-end throughput from an end-user device to various specific servers deployed on the cloud platform 114. This allows end-users or subscribers to fully understand congestion values at different locations at different times.

Wi-Fi Speed: Wi-Fi Speed is the estimated throughput between an end-user device and a modem/router. When there is more than one user connecting to the same network, capacity may be downgraded. The information related to Wi-Fi speed may help ISPs determine poorly performing devices on the network.

In-depth traffic flow analysis: The Wi-Fi console application 108 is configured to enable end-users and their subscribers to monitor their traffic flow 24/7, the applications used, the application-based consumption rates, latency values, and all other QoS/QoE metrics obtained through their in-home Wi-Fi infrastructure.

App-based guest device control: The Wi-Fi console application 108 is configured to provide end-users or their customers with a clear view of how guests engage with a Wi-Fi network that may include, but is not limited to, a number of users connected to a single Wi-Fi access point, the distribution of end-users between different Wi-Fi access points, and a specific area end-users connect from.

Device block/unblock: The Wi-Fi console application 108 is configured to enable automatic device blocking and unblocking without accessing a Wi-Fi access point or router. In this way, end-users may easily decide which devices are to be connected at a given time instant.

The QoE/QoS evaluation module 222 is further configured to combine information on usage patterns associated with an end-user's digital experience and performance data to determine information on Wi-Fi signal coverage and interference distribution for each floor/room/space on the end-user's site. The QoE/QoS evaluation module 222 is configured to enable an end-user to address interference and congestion issues ahead of time and obtain a realistic view of a number of Wi-Fi access points required and placement of the Wi-Fi access points to obtain high-performing Wi-Fi.

The QoE/QoS evaluation module 222 is further configured to provide different QoS parameters/levels to different end-users through media prioritization. Each subscriber client device associated with an end-user may be set with a specific bandwidth allocation level.

The QoE/QoS evaluation module 222 is further configured to provide ISPs a view of a network environment and digital experiences of end-users who are subscribers to the ISPs. The ISPs are enabled to monitor traffic flow during peak times, applications used by the subscribers and QoS/QoE metrics obtained for a single subscriber, or all subscribers, in a given region or globally through geolocation maps.

The QoE/QoS evaluation module 222 is further configured to provide QoE scoring for an end-user based on daily/weekly performance for an individual subscriber or for a group of subscribers.

The load balancing module 224 may comprise suitable logic, interfaces, and/or code that may be configured to perform load balancing among different frequency bands and Wi-Fi access points by enabling an end-user to automatically adjust an operating band or frequency of a corresponding subscriber client device based on at least one of data requirements of the subscriber client device, a distance of the subscriber client device from a Wi-Fi access point and performance pertaining to the end-user of the subscriber client device.

The motion analysis module 226 may comprise suitable logic, interfaces, and/or code that may be configured to configure the one or more subscriber client devices 106A-106N to act as motion sensors to perform motion analysis to detect expected and unexpected in-home/office movement. The motion analysis module 226 is configured to enable an end-user to customize settings on the Wi-Fi console application 108 to view which room in the home the motion is occurring in, to notice when family members or guests arrive in the home, to automatically activate and deactivate the motion analysis and/or to automatically deactivate the one or more subscriber client devices 106A-106N from being used as motion sensors.

The Wi-Fi sharing module 228 may comprise suitable logic, interfaces, and/or code that may be configured to enable ad-hoc Wi-Fi sharing (using second hand Wi-Fi) to increase an end-user's Wi-Fi access point's coverage in blind-locations where infrastructure and signal quality are limited. For instance, if an end-user is outside of the coverage area of a Wi-Fi access point, the Wi-Fi sharing module 228 is configured to enable the end-user to access a signal and connect over another end-user who is closer to that Wi-Fi access point. Further, the Wi-Fi sharing module 228 is configured to enable Wi-Fi sharing based on tracking the connection status, connection requests, secure access, transaction demands, location-based Wi-Fi access point searching and reservation.

To enable secure Wi-Fi sharing, a guest can send connection requests to any registered AP. In order to send a connection request, a subscriber client device (STA) must obtain the beacon signal from the registered AP. Thus, the corresponding subscriber client device application should have a Wi-Fi scan permission. The AP owner can confirm (confirmation can be done instantly or at the time of reservation) the connection of the guest or reject the request. The procedure is applicable only if the AP owner is also connected to the AP for security issues since not all routers are modifiable remotely from the cloud platform 114.

An AP owner gets a notification after the connection or reservation request. If the AP owner approves the connection/reservation, the transaction process is triggered to transfer money/cost from the guest to the AP owner based on the required time of connection under predetermined constraints and conditions. The methods used by the subscriber client device application to provide the connection are as follows: In the first method, the Wi-Fi password is shared with a user from the cloud platform 114 and the connection is established by the subscriber client device application automatically. The process of sharing passwords may also be handled with encrypted message exchanges between the applications of the guest and the AP owner. The subscriber client device application then allows the guest to connect to the AP (without explicit password sharing). Most Android versions limit the password sharing or viewing for such cases. However, its AP owners risk sharing the password for the cases in which the guests share the password to someone else. Yet again, on the AP side, the guest's Media Access Control (MAC) address can be added to the list of allowed MAC addresses. In this way, access to the system with another MAC address may be prevented.

In the second method, the AP owner adds the guest to the white list of the AP. Thus, guests on the white list can access the Internet. On the other hand, the MAC address of the guest is transferred to the blacklist after the connection time has exceeded or the accepted pricing model for the amount paid has ended.

The offload optimization module 230 may comprise suitable logic, interfaces, and/or code that may be configured to enabling offloading from a licensed spectrum to an unlicensed spectrum both for a Wi-Fi operator and an end-user. The AI model 214 is configured to determine whether the offloading is desirable or not based on parameters that may include, but are not limited to, Wi-Fi interference, number of active users, licensed spectrum status, costs, guest characteristics, and RSSI.

Offloading transfers the data flow from a licensed spectrum to an unlicensed spectrum. The shift from the licensed to the unlicensed spectrum is not always a wise decision since the interference in the unlicensed spectrum might cause significant QoS reduction, causing customer dissatisfaction and data delivery failures. On the other hand, there should be enough demand in the licensed spectrum to offload or the unlicensed spectrum should be significantly idle to make offloading practically desirable. Therefore, the AI model 214 is configured to determine whether the offloading is desirable or not. In some cases, the AP owners have the option to accept or reject a connection request based on any personal reason. For the case of an operator, the user does not have to request Wi-Fi access from the operator APs. The offload optimization module 230 is configured to detect any operator AP and start the association if the AI model 214 determines that the offload is desirable. The inputs to the AI model 214 include, but are not limited to, Wi-Fi interference, number of active users, licensed spectrum status, costs, guest characteristics, and RSSI. Consequently, in case a mobile operator decides to offload their cellular data to the Wi-Fi network making use of the offload optimization module 230, the mobile operator can automatically let its users connect to the Wi-Fi network without any consent. In this way, the mobile operator always has an alternative option to transfer the data via the cheapest and most reliable way while using any access point available.

The bottleneck tracking and resolution module 232 may comprise suitable logic, interfaces, and/or code that may be configured to tracks bottlenecks in the path of the one or more Wi-Fi networks and perform Border Gateway Protocol (BGP)/Multiprotocol Label Switching (MPLS) troubleshooting at an end-user's or a subscriber's end. For the BGP/MPLS troubleshooting, the bottleneck tracking and resolution module 232 is configured to ensure the prefix propagation is across the one or more Wi-Fi networks, classify the IP blocks and benchmark the hops by grouping subscribers.

The bottleneck tracking and resolution module 232 is further configured to track the bottlenecks by deriving, using the AI model 214, key characteristics of problems and root causes of performance issues in the one or more Wi-Fi networks based on analyzing traffic data in a Wi-Fi network, identifying behavior of end-users and classifying the behavior into well-known troubleshoot problems using support vector machines in the AI model 214. The troubleshoot problems may include, but are not limited to, dead spots, weak signals, outdated equipment, faulty installation, and backhaul problems. The bottleneck tracking and resolution module 232 is further configured to record abnormal behavior of connected subscriber client devices which includes recording subscriber client device-specific connection issues, frequent log in and log outs, power cutoffs, and Wi-Fi access point/router restarts, and performing periodic channel scanning to detect any vague non-subscriber client device in the vicinity that may be a new router working as a hotspot, or a device slowing down the performance of the local area network, and many other abnormal behaviors of connected devices.

The bottleneck tracking and resolution module 232 is also configured to provide actionable recommendations in simple English to be forwarded to subscribers for high-performing Wi-Fi. These actionable recommendations include, but are not limited to, a request to change the position of an AP and an alert in case CPU, RAM and bandwidth thresholds are exceeded or a warning regarding insufficient throughput for multimedia applications at certain times of the day.

The bottleneck tracking and resolution module 232 is further configured to fix problems of the Wi-Fi network directly using deep learning in the AI model 214, to flag conditions for immediate action, analyze trends in performance of the Wi-Fi network, predict requirements to avoid problems in the Wi-Fi network in future, and constantly add to a knowledge base and extend its repertoire of known problems and solutions.

The bottleneck tracking and resolution module 232 is further configured to perform network monitoring and diagnosis using the AI model 214 and predict network/infrastructure/device issues before ISPs' operations are affected and are brought to the attention of network teams by issuing a ticket along with potential troubleshooting guidelines.

The bottleneck tracking and resolution module 232 is further configured to identify and classify each subscriber behavior into well-known trouble-shoot problems by support vector machines that may include, but are not limited to, supervised learning models with associated learning algorithms that analyze data used for classification and regression analysis including dead spots, weak signals, outdated equipment, faulty installation, and backhaul problems. The deep learning model is trained accordingly, and engines start flagging, whether a subscriber is likely to lodge a complaint or not, with respect to their Wi-Fi conditions. This information is then used by a service provider to take action and make it available at the contact centers before a call happens.

An extensive AI prediction engine in the AI model 214 is further configured to perform load balancing to auto-correct a network issue of the one or more Wi-Fi networks and a forecast is provided for one or more Wi-Fi network parameters (such as, but not limited to, Wi-Fi speed) on the dashboard of a subscriber or an end-user, and Wi-Fi choking and interference is inferred.

In accordance with an exemplary embodiment, a Post Office Protocol (POP) and Internet Protocol (IP) block monitoring in the backhaul from a subscriber client device using the bottleneck tracking and resolution module 232 is illustrated.

The bottleneck tracking and resolution module 232 is configured to collaboratively monitor the end-to-end connectivity and ensure there is no black hole in the network and that the transit path works flawlessly.

Furthermore, the AI model 214 in conjunction with the bottleneck tracking and resolution module 232 is configured to apply a machine learning algorithm to solve significant problems associated with Wi-Fi networks, thus reducing the cost of troubleshooting potential connection problems that may occur from several possible sources. The intelligence and algorithms sit both at the edge on a subscriber client device, as well as in the cloud platform 114, where a large number of devices are feeding the machine learning algorithm in a virtuous circle, which makes it more accurate and valuable to anticipate and fix new problems. The AI model 214 is configured to allow the key characteristics of problems in a Wi-Fi network to be picked out from the Big Data, that is the mass of traffic data, fix known problems directly, analyze trends in performance, and predict future requirements to avoid problems altogether in future. This would allow the Wi-Fi network management system to constantly add to its knowledge base, extend its repertoire of known problems and solutions, and raise standards of user experience.

When data is aggregated and processed collaboratively, it can serve to identify the root cause of performance issues such as, but not limited to: What is the optimum level of network performance? How far is the network from operating at optimum? Which APs, Wireless Local Area Networks (WLANs), and users are most affected? Which are the most impactful issues identified for prioritization? Moreover, each subscriber behavior is identified and classified into well-known troubleshoot problems by support vector machines including, but not limited to, dead spots, weak signals, outdated equipment, faulty installation, backhaul problems. This information is useful when combined with subscriber lists that trigger real complaints. A deep learning model of the AI model 214 is trained accordingly, and engines start flagging, whether a subscriber is likely to file a complaint or not, with respect to their Wi-Fi conditions. This information is then used by a service provider to take action and make it available at contact centers before a call happens.

Further, the insights/recommendations module 220 in conjunction with the bottleneck tracking and resolution module 232 is configured to provide customers and their subscribers with information based on monitoring and analyzing the impact of all devices, including IoT devices, sensors, cameras on an end-user's network environment to improve performance across all devices in the network, for instance, by achieving more efficient utilization of channels.

Furthermore, the bottleneck tracking and resolution module 232 is configured to enable operators to diagnose and solve Wi-Fi-related issues or to differentiate Wi-Fi-related degradations from other causes of poor customer experience. This also enables subscribers to resolve their Wi-Fi issues on their own without having to contact their service providers. For service providers, providing the customer the ability to solve Wi-Fi problems, lowers operating costs stemming from ineffective or lengthy support calls, costly "truck rolls" for on-site service, and CPE replacement.

Figure 6A:
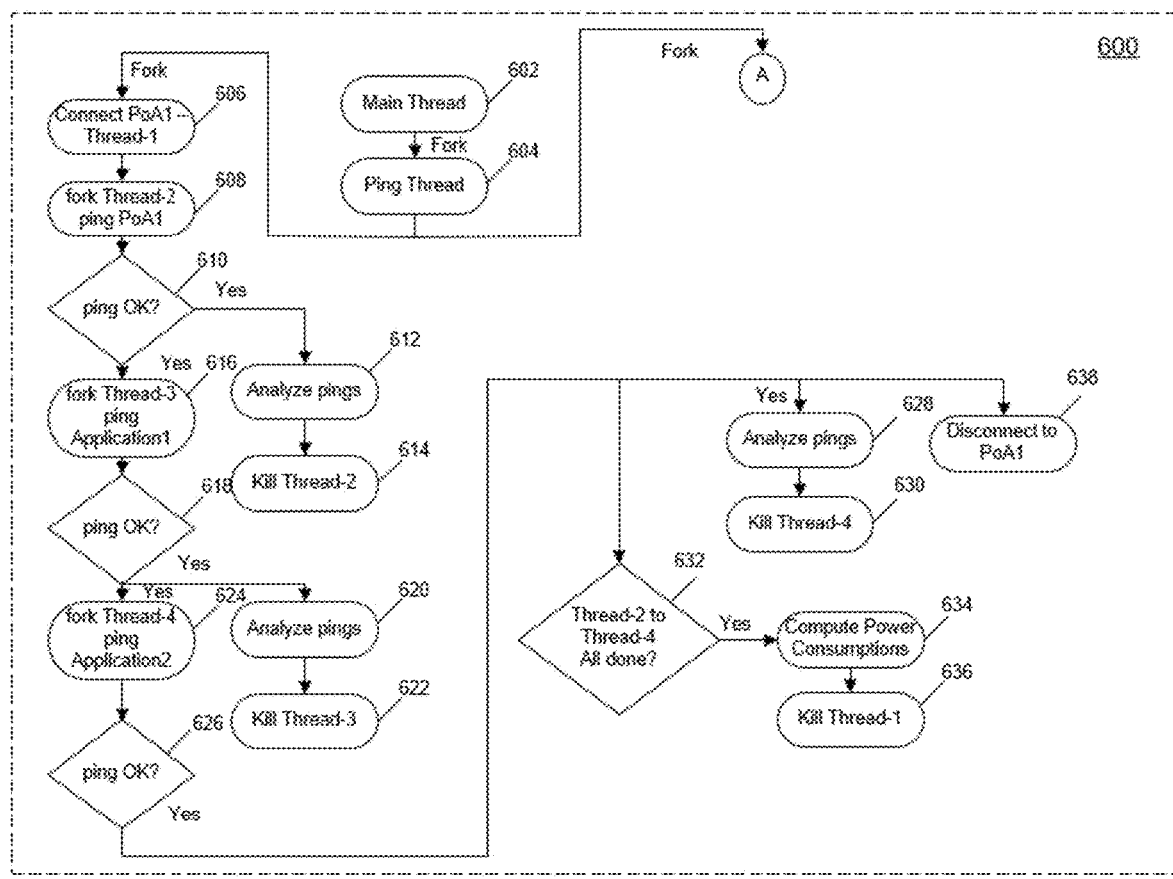
FIG. 6A and FIG. 6B collectively is a flowchart that illustrates a method for multithreaded programming depicting ping transmissions when there are two available Wi-Fi access points or point of attachments (PoAs), in accordance with an exemplary embodiment of the disclosure.
Figure 6B:
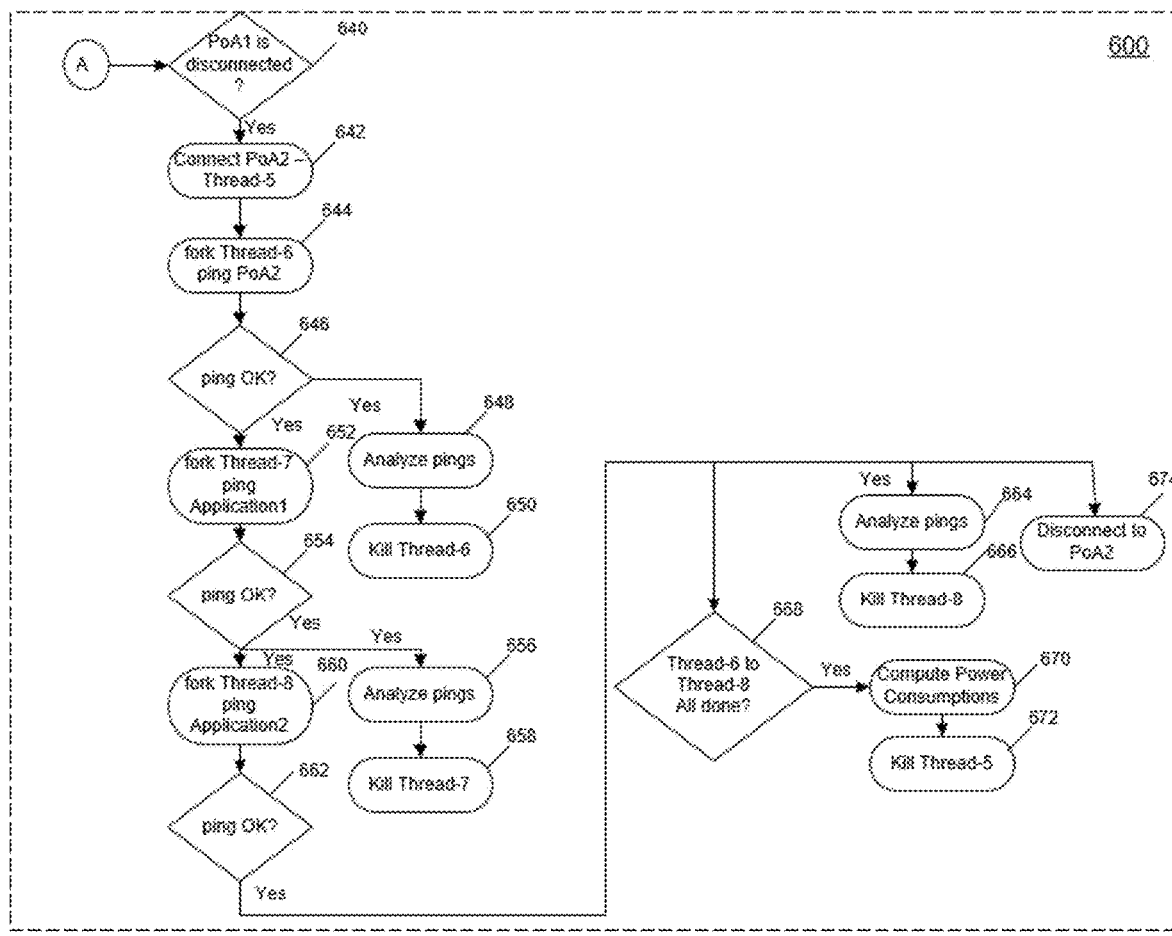

The multi-threaded programming module 234 may comprise suitable logic, interfaces, and/or code that may be configured to minimize processing time in the analysis phase of the application in case users have more than one Wi-Fi access point or router to be connected. In this regard, AsyncTask class is used to manage waiting processes of threads that work concurrently and require results of an earlier thread(s) to terminate. AsyncTask class enables processes that run on different threads in the background to integrate into the main thread that run on foreground with ease. Thus, the drawbacks of a multi-threaded structure, in terms of processes waiting for one another is also handled, making use of the AsyncTask. Multi-threaded programming executed in the multi-threaded programming module 234 for a proposed network selection application in case there are only two available Wi-Fi access points, is illustrated in FIG. 6A and FIG. 6B.

The testing module 236 may comprise suitable logic, interfaces, and/or code that may be configured to perform pre-event silent testing or on-demand testing to help an end-user manage/tune a Wi-Fi network infrastructure for better network performance during specific events to avoid congestion and support connectivity. The testing module 236 is further configured to enable end-users to run a synthetic test whenever they want to collect detailed metrics and gain insights about their infrastructure/network and view recommendations regarding what to do for better performance/experience.

Furthermore, during the installation of a home gateway, technicians are often blind about what is going on in the immediate RF environment. This often leads to repeated truck rolls, which are expensive. The testing module 236 is further configured to enable a network team to assess deployment requirements, including monitoring the RF environment especially interference coming from neighbors to improve the probability that the installation will be swift and successful, leading to a decrease in service calls or wrongful hardware replacement, and further coordinating between technicians in the network team and end-users for swift and successful installation of the home gateway. A field console provides the tools to coordinate installers and customers to do their jobs effectively.

A benefit to having a decentralized function on a subscriber client device rather than the gateway is the ability to take full advantage of the cloud-based stack across the devices, homes, and even networks with zero integration required. The Wi-Fi console application 108 SDK communicates its local parameters, key metrics, and the accumulated information to the cloud platform 114, thus benefitting all the device users, preventing channel interference and enforcing band or channel steering when needed.

The AP rating module 238 may comprise suitable logic, interfaces, and/or code that may be configured to assess performance of a plurality of Wi-Fi access points and assign a rating to each Wi-Fi access point based on the performance. The rating thus assigned enables a subscriber client device to connect to the Wi-Fi access point that provides a best connection.

The AP rating module 238 is further configured to provide one or more alerts to an end-user regarding when to switch between a cellular network and a Wi-Fi network, or when to upgrade application services/operating systems, based on a level of experience of the end-user.

The backup and restoration module 240 may comprise suitable logic, interfaces, and/or code that may be configured to provide backup and restoration services to an end-user seeking backups of key historical user data on network/infrastructure elements. The historical user data may include, but are not limited to, specific location of Wi-Fi access points, their SSID names, coverages, interference information per Wi-Fi access point, historical data regarding the infrastructure, historical traffic flow and consumption, past network diagnoses and processes. The backup is updated on an hourly/daily/weekly/monthly basis depending on the end-user's needs and is used for recovering data after an incident such as, for instance, a network security threat.

Figure 3:
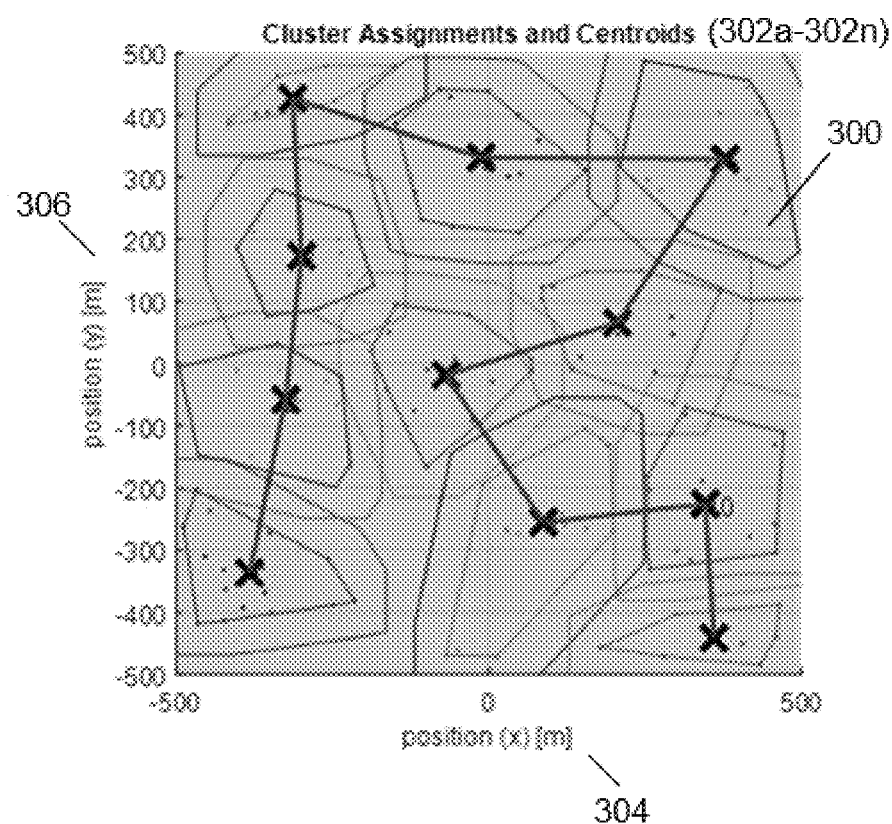
FIG. 3 is a diagram illustrating spectrum allocation with AI-adaptive clustering and heuristic optimization in accordance with an exemplary embodiment of the disclosure.

FIG. 3 is a diagram illustrating spectrum allocation with AI-adaptive clustering and heuristic optimization in accordance with an exemplary embodiment of the disclosure. Referring to FIG. 3, there is shown a relational aggregated graph 300 depicting cluster assignments and centroids 302a-302n, the x-axis and y-axis representing position (x) 304 and position (y) 306 respectively.

The relational aggregated graph 300 depicts AP-to-AP and AP-to-device relations. This thorough view of a wireless network is then utilized for optimization.

Figure 4:
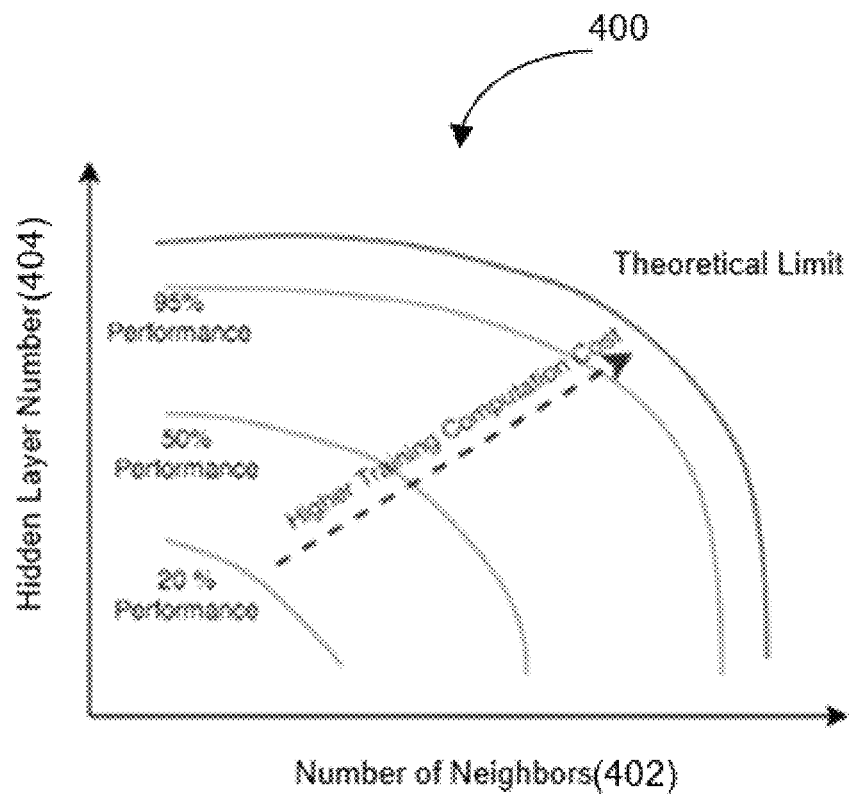
FIG. 4 is a diagram that illustrates a graph depicting neighbors' interference impact and how increasing deep learning layers compensates for the interference in accordance with an exemplary embodiment of the disclosure.

FIG. 4 is a diagram that illustrates a graph depicting neighbors' interference impact and how increasing deep learning layers compensates for the interference in accordance with an exemplary embodiment of the disclosure. Referring to FIG. 4, there is shown a graph 400 with x-axis depicting number of neighbors 402 and y-axis depicting hidden layer number 404.

From the graph 400, as the number of hidden layers increases, the impact of interference from neighboring client devices decreases. Higher training computation cost is incurred as the performance increases. In order to solve this issue, the AI-based solver in the AI model 214 is configured to first decompose the relational graph into dynamic clusters, then apply a heuristic deep-learning method to reduce a computation time of optimization to provide fast-switching recommendations for the right band or channel. This is done to mitigate the increasing number of collisions and errors in the network, which increases network slowdowns and thus penalizes end-users. Thus, the optimization aims at avoiding those collisions.

Figure 5A:
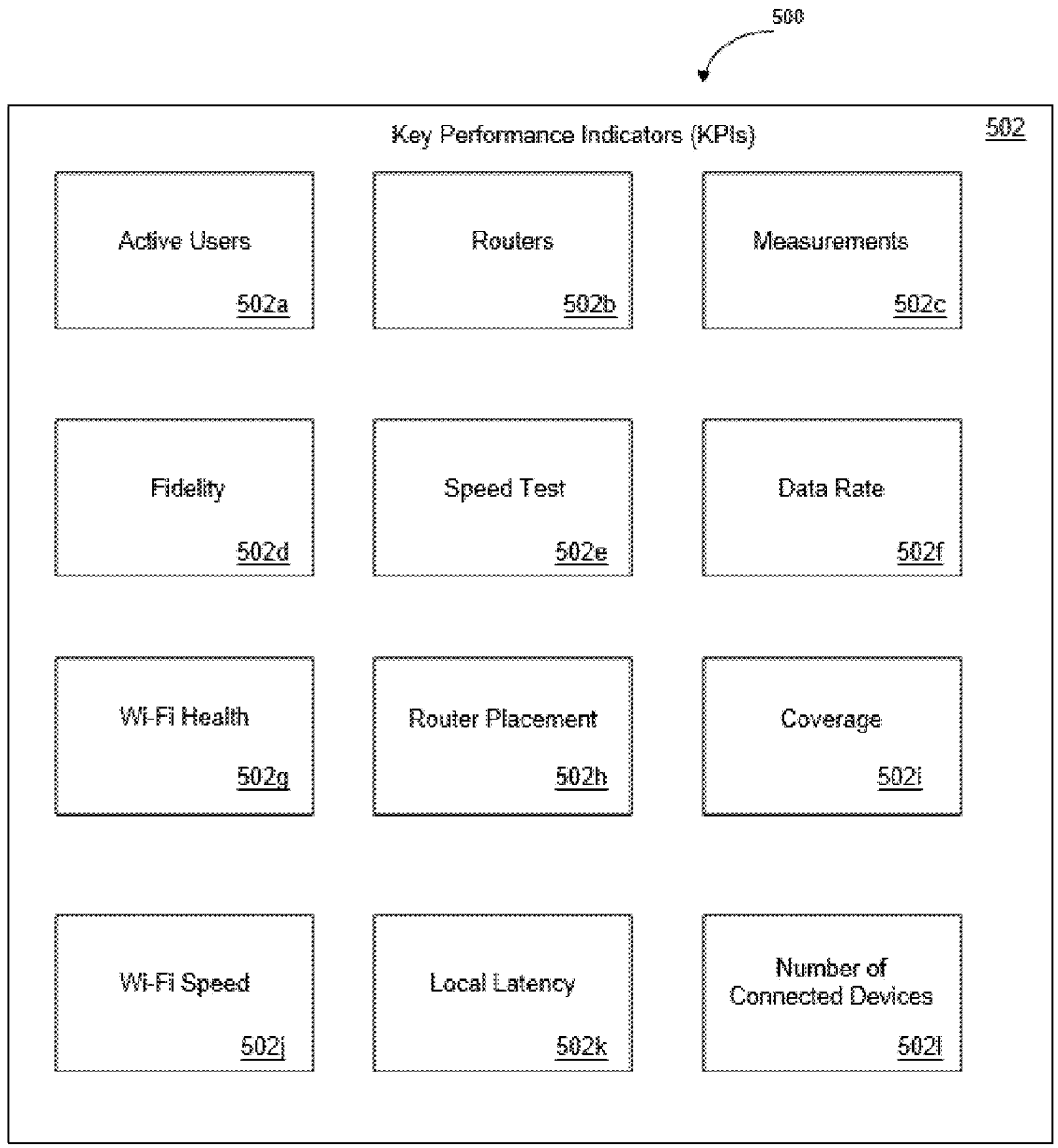
FIG. 5A is a diagram illustrating a dashboard of a subscriber client device that is generated by the Wi-Fi console application in accordance with an exemplary embodiment of the disclosure.

FIG. 5A is a diagram illustrating a dashboard of a subscriber or an end-user that is generated by the Wi-Fi console application in accordance with an exemplary embodiment of the disclosure. Referring to FIG. 5A, there is shown a user-friendly dashboard 500 depicting Key Performance Indicators (KPIs) 502 that IT departments of operators, hotel brands, or businesses are concerned with, in order to be able to monitor the health of their customers' Wi-Fi networks. The KPIs 502 may include, but are not limited to, the following: Active Users 502a, Routers 502b, Measurements 502c, Fidelity 502d, Speed Test 502e, Data Rate 502f, Wi-Fi Health 502g, Router Placement 502h, Coverage 502i, Wi-Fi Speed 502j, Local Latency 502k and Number of Connected Devices 502l. The details pertaining to the KPIs 502 are as follows:

Active Users 502a represent the number of devices that are active in the network. This metric provides a high-level view of how crowded the network is at a given point in time or how crowded the network will be in future.

Routers 502b represent the number of neighboring SSIDs that the Wi-Fi console application 108 detects through the scanning of neighboring access points using the RF monitoring module 208. This is a good indicator of how busy the RF environment is in a given area and for a period of time.

Measurements 502c indicate the number of scans sent to the cloud platform 114 that may include, but are not limited to, neighboring SSIDs, speed test, and latency.

Fidelity 502d is based on the SNR and a comparison of the level of the Wi-Fi signal to the level of neighboring interferers.

Speed Test 502e measures the end-to-end throughput from a subscriber client device to a specific server.

Data Rate 502f provides the maximum physical layer rate (theoretical value) that a subscriber client device can transmit data at in a given instance. However, in the real world, there will be interference and losses which will result in a lower bit rate. The throughput may be a practical value that the wireless link can achieve.

Wi-Fi Health 502g combines how well a router is placed and how much coverage capacity the router has.

Router Placement 502h is how well a router (CPE) receives its signals.

Coverage 502i indicates whether there is shortage in coverage.

Wi-Fi Speed 502j is the throughput between a subscriber client device and a modem/router. In accordance with an exemplary embodiment, a graph depicting prediction of a number of sessions in a Wi-Fi network is provided to an end-user. The Wi-Fi speeds in good category (may be depicted in green) will decrease and medium (may be depicted in blue) and bad (may be depicted in red) groups will increase. An operator can infer from this graph that Wi-Fi will be choked in the next upcoming days.

Local Latency 502k represents the delay between a subscriber client device and a Wi-Fi access point or router.

Number of Connected Devices 502l indicates how many Wi-Fi devices are connected to a router at a given instance.

Additionally, customer insights are provided on the dashboard 500 using appropriate APIs that are integrated into a customer's Customer Relationship Management (CRM). The dashboard 500 is a first-stop for a contact center operation to provide insights, as well as AI-based recommendations such as, but not limited to, "Your position is good for web browsing but not for Video Conferencing!" or "You have coverage holes, better to upgrade to mesh!". An update to the SDK further enables placing the router at the best possible place in a building considering parameters that may include, but are not limited to, the interference, number of users, and ongoing applications, by getting support (real-time computation versus movement of the router within the building) from users. Each operator, business, or venue owner can further set their own parameters that reflect their own service level agreements (SLAs) or their QoE objectives.

Figure 5B:
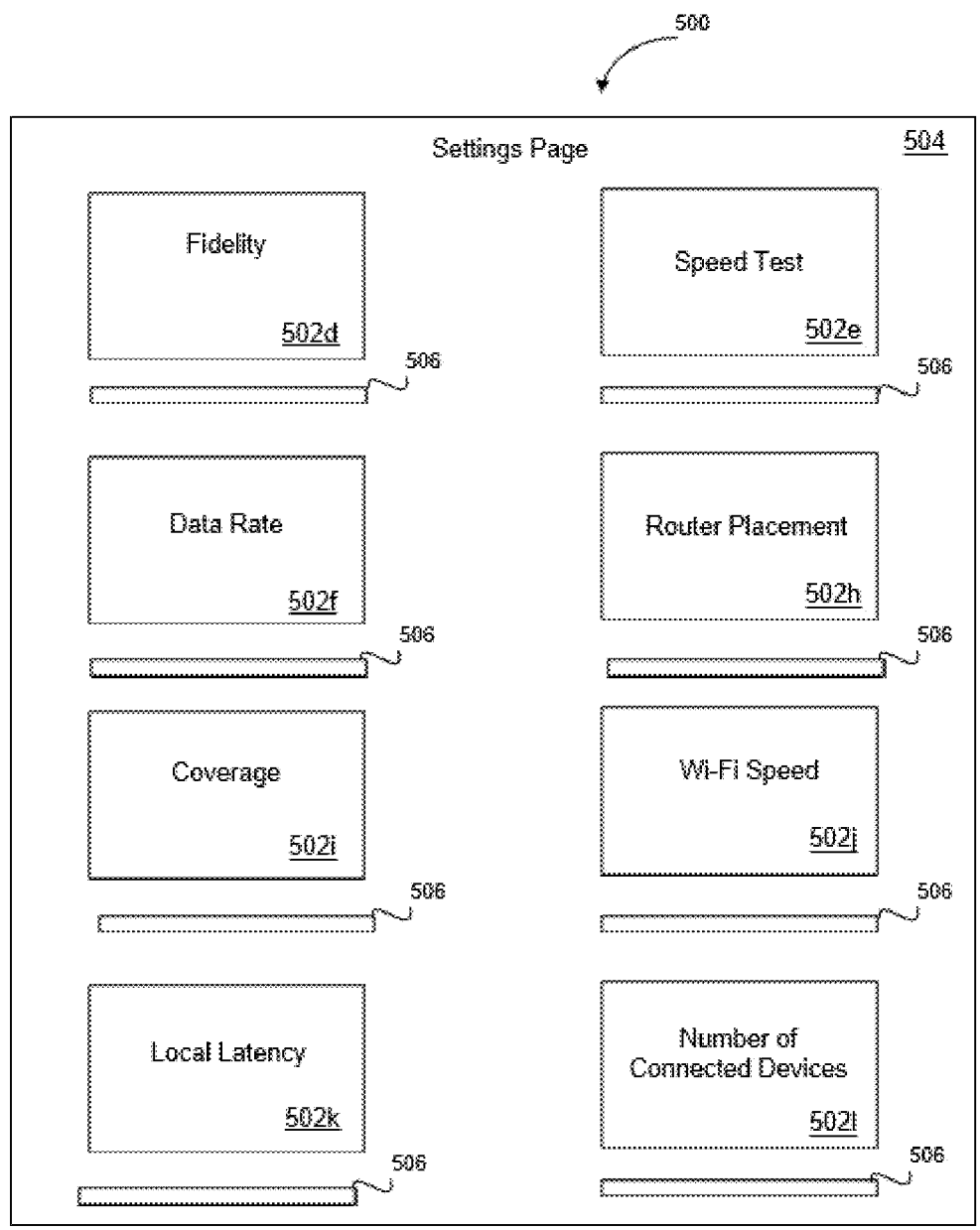
FIG. 5B is a diagram illustrating a settings page of a dashboard of a subscriber client device for adjusting threshold levels for eight Key Performance Indicators (KPIs) in accordance with an exemplary embodiment of the disclosure.

FIG. 5B is a diagram illustrating a settings page of a dashboard of a subscriber or an end-user for adjusting threshold levels for eight KPIs in accordance with an exemplary embodiment of the disclosure. Referring to FIG. 5B, there is shown a settings page 504 of the dashboard 500 depicting adjustable threshold levels 506 for Fidelity 502d, Speed Test 502e, Data Rate 502f, Router Placement 502h, Coverage 502i, Wi-Fi Speed 502j, Local Latency 502k, and Number of Connected Devices 502l.

FIG. 6A and FIG. 6B collectively is a flowchart that illustrates a method for multithreaded programming depicting ping transmissions when there are two available Wi-Fi access points or point of attachments (PoAs), in accordance with an exemplary embodiment of the disclosure. Referring to FIG. 6A and FIG. 6B, there is shown a flowchart 600 for multi-threaded programming executed in the multi-threaded programming module 234 for a proposed network selection application in case there are only two available PoAs (for example, APs).

Referring to FIG. 6A, at 602, a Main Thread initiates the process. At 604, a fork process launches a Ping Thread which initiates the ping transmissions.

At 606, PoA1 is connected to Thread-1. At 608, the fork process launches a Thread-2. which handles ping transmissions to PoA1. At 610, upon determining that the ping transmissions are 'OK', at 612, the ping transmissions are analyzed, and Thread-2 is killed or terminated at 614. Concurrently, at 616, the fork process launches Thread-3 which handles ping transmissions to Application1.

Ping transmissions for Application1 are handled by Thread-3 in the analysis of PoA1 and at 618, upon determining that the ping transmissions are 'OK', at 620, the ping transmissions are analyzed, and Thread-3 is killed or terminated at 622. Concurrently, at 624, the fork process launches Thread-4 which handles ping transmissions for another web application, Application2.

Ping transmissions for Application2 are handled and at 626, upon determining that the ping transmissions are 'OK', at 628, the ping transmissions are analyzed, and Thread-4 is killed or terminated at 630.

While Thread-4 works on Application2 pings, Thread-3 concurrently analyzes ping results of Application1 coming from the Linux terminal commands, and computes average Round Trip Times (RTTs) and makes the system ready for the analysis.

While Thread-4 works on Application2 pings, Thread-3 and Thread-2 can concurrently analyze the ping results of the PoA1. However, Thread-4 is never created before Thread-3 finishes the ping transmissions. In this way, concurrent ping transmissions for two different web applications (i.e. Application1 and Application2) are prevented. Concurrent ping transmissions for more than one web application results in higher average RTT results than expected, which means inaccurate computations.

Moving on, at 632, it is determined whether Thread2, Thread3 and Thread4 have completed execution. Then at 634, power consumptions associated with the thread executions are computed and at 636, Thread-1 is killed or terminated. Then, at 638, PoA1 is disconnected.

Referring to FIG. 6B, at 640, it is determined if PoA1 is disconnected. At 642, PoA2 is connected to Thread-5. At 644, the fork process launches a Thread-6 which handles ping transmissions to PoA2. At 646, upon determining that the ping transmissions are 'OK', at 648, the ping transmissions are analyzed, Thread-6 is killed or terminated at 650. Concurrently, at 652, the fork process launches Thread-7 which handles ping transmissions to Application1.

Ping transmissions for Application1 are handled by Thread-7 in the analysis of PoA1 and at 654, upon determining that the ping transmissions are 'OK', at 656, the ping transmissions are analyzed, and Thread-7 is killed or terminated 658. Concurrently, at 660, the fork process launches Thread-8 which handles ping transmissions for Application2.

Ping transmissions for Application2 are handled and at 662, upon determining that the ping transmissions are 'OK', at 664, the ping transmissions are analyzed, and Thread-8 is killed or terminated at 666.

While Thread-8 works on Application2 pings, Thread-7 concurrently analyzes ping results of Application1 coming from the Linux terminal commands, and computes average Round Trip Times (RTTs) and makes the system ready for the analysis.

While Thread-8 works on Application2 pings, Thread-7 and Thread-6 can concurrently analyze the ping results of the PoA2. However, Thread-8 is never created before Thread-7 finishes the ping transmissions. This way, concurrent ping transmissions for two different web applications (i.e. Application1 and Application2) are prevented.

At 668, it is determined whether Thread6, Thread7 and Thread8 have completed execution. Then at 670, power consumptions associated with the thread executions are computed and at 672, Thread-5 is killed or terminated. Then, at 674, PoA2 is disconnected.

Figure 7:
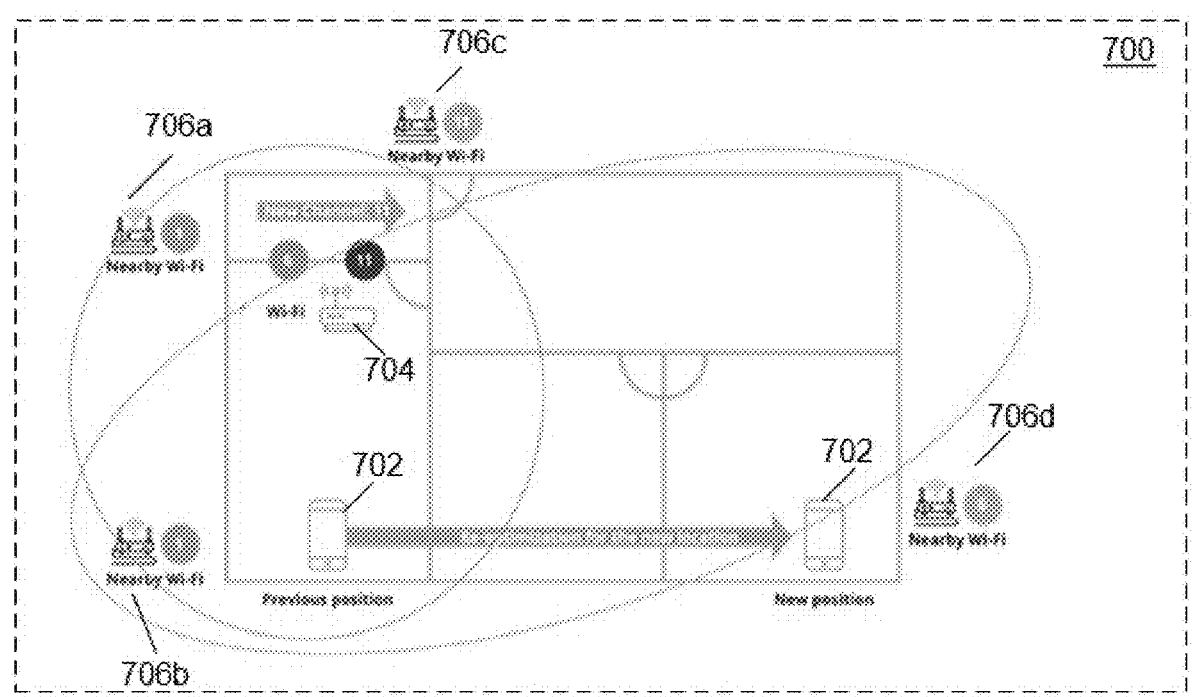
FIG. 7 is a diagram that illustrates home deployment of a Wi-Fi console application in accordance with an exemplary embodiment of the disclosure.

FIG. 7 is a diagram that illustrates home deployment of a Wi-Fi console application in accordance with an exemplary embodiment of the disclosure. Referring to FIG. 7, there is shown a home network 700 that includes a subscriber client device 702, a Wi-Fi router 704 to which the subscriber client device 702 is connected to, and a plurality of nearby Wi-Fi routers 706a, 706b, 706c and 706d.

The subscriber client device 702 is configured to scan immediate channel conditions instead of relying on a centralized gateway using the Wi-Fi console application 108 which provides a more precise and dynamic solution. If, for instance, the subscriber client device 702 is using channel 6, and walks to the kitchen where a neighboring client device also uses channel 6, machine learning algorithms of the AI model 214 informs the client device 702 to move to another channel, such as, for instance, channel 11.

Furthermore, the Wi-Fi console application 108 enables smooth running of OTT applications such as, but not limited to, video streaming. The spectrum orchestration module 218 is configured to provide application aware spectrum allocation in order to consider throughput requirements of each user or the subscriber client device 702 in the home network 700. When neighboring client devices exceed a number of overlapping channels, the need to allocate channels according to session types is inevitable. A 4K TV streaming video or a video conference has different throughput and latency requirements than web browsing or email activity. Therefore, applications requiring high throughput require a priority access to clean channels, which will result in a better overall QoE for subscribers. Furthermore, a service provider can monitor the range of devices and operating systems in use by customers, and an operator can detect legacy devices and forecast the upgrades.

Thus, the Wi-Fi console application 108 provides important implications for service providers serving home customers. Further, the ability to diagnose and solve problems more quickly results in a better customer experience, a higher net promoter score, and a lower churn for the operator. It also has a positive impact on operators as OPEX is reduced because of less and shorter calls, as well as less truck rolls and wrongful hardware replacements.

Furthermore, in order to enable subscribers to resolve their Wi-Fi issues on their own without having to contact their service providers, the Wi-Fi console application 108 and the Wi-Fi console cloud service provide consumers with the necessary insights and optimization. Thus, the Wi-Fi console application 108 acts as the first line of resolution of home Wi-Fi problems and results in a less number and duration of service calls, thus generating notable savings to the service provider in terms of OPEX, lower churn, and higher net promoter scores.

The Wi-Fi console application 108 further provides a very flexible platform that can optimize the Wi-Fi experience based on importance of user activity. For example, for a user giving a presentation for a business meeting, the Wi-Fi console application 108 prioritizes the user's router in the vicinity to ensure there is no interruption or connection drop due to other individuals' internet usage. Similar examples can be further elaborated such as, but not limited to, listening to online classes, taking exams, giving presentations, or watching a 4K video.

Various applications and deployments of the Wi-Fi console application 108 are further described in conjunction with exemplary embodiments of the disclosure.

In accordance with an exemplary embodiment, the Wi-Fi console application 108 can be used with a plurality of voice assistants to improve QoE in the home network 700.

For instance, consider a user has a 9 am presentation and is worried about his internet connection. With the current settings, the user is unable to guarantee if his meeting will not be disconnected if a household member decides to concurrently stream or download a large file. In this scenario, the Wi-Fi console application 108 enables the user to set priorities for his device, his computer or by simply telling a voice assistant to, "prioritize my computer". The voice assistant uses the Wi-Fi console application 108 to thoroughly optimize the traffic with respect to the user's computer and location in the home network 700.

Further, if neighbors are also involved, the voice assistant prioritizes the user and in conjunction with the spectrum orchestration module 218, allocates an interference free channel during the session.

Furthermore, the Wi-Fi console application 108 enables immediately identifying of an Internet issue and fixing the issue using the bottleneck tracking and resolution module 232 using voice assistance, thus saving the user's time and frustration. For example, if the user's TV has an issue with Wi-Fi connectivity, a call center can immediately inform the user via the voice assistant about this issue, indicating parameters that may include, but are not limited to, the internet connection speed over the past week, identifying non-optimal modem location, an internet service provider error in the user's location, or neighborhood interference issue. The bottleneck tracking and resolution module 232 also provides an optimal solution, such as, but not limited to, finding an alternative router location, recommending an equipment replacement or contacting the respective service provider depending on the user's location.

Apart from voice assistance, Wi-Fi tops the list of factors influencing booking decisions by hotel guests. Most large hotels have outsourced their Wi-Fi functions to third party-managed service providers (MSPs) who manage and provide support for all things Wi-Fi related. Those same MSPs are the ones who can deploy new technologies and provide them as a new service to hotel brands. In this context, hotels may use the Wi-Fi console application 108 to monitor the activity in their network and anticipate interference and congestion issues ahead of time. The MAP function enables the user to pinpoint a particular location or AP, which comes in handy when hotels often manage multiple locations.

With over 90% of sales still occurring in physical locations, shopping malls remain central to the success of global retail. The rise of sophisticated omni-channel retail strategies has demonstrated that brick-and-mortar stores are an integral part of the consumer experience. Malls are an ideal ground for experimenting new retail formats, designs, and technologies such as, but not limited to, guest Wi-Fi. They are increasingly acting as an enabler for omni-channel retailing, providing enhanced services for customers, and assisting retailers with their distribution and fulfillment strategies by way of offering guest Wi-Fi, centralized click-and-collect services, and collection lockers for online retailers. Guest Wi-Fi provides the opportunity for shopping malls and tenants to acquire customer insights from their Wi-Fi network (including, footfall traffic), which will thereby impact rent and shopping mall revenues. Guest Wi-Fi can also be used to assist customers with mall navigation, timely information and alerts, and providing a more personalized shopping experience.

However, such a Wi-Fi network must be dependable and stable for both retailers and their customers. Each independent retail Wi-Fi network contributes to crowding the RF environment inside a mall, thus raising the need to provide some order to networks competing for airtime in overlapping channels. Unfortunately, each retailer uses a different access point from different vendors who are notorious for not interoperating with each other. Further, when controllers are used, they only control the same vendor access points.

To solve this issue, the Wi-Fi console application 108 utilizes existing mall apps by integrating its SDK, and the cloud platform 114 acts as a broker over many Wi-Fi networks under different ownership and manages the spectrum and transmits power allocation by using the user-side heat map constructed from information of the subscriber client devices. Thus, spectrum orchestration brings RF order in an otherwise chaotic and unpredictable environment.

OTT refers to the practice of delivering media over the Internet, and bypassing traditional telecom infrastructure such as, but not limited to, cable, broadband, and satellite platforms to provide services to the end-user. Today, with many service providers in the ecosystem delivering a high quality of user experience, streaming consistency and seamless delivery of content is critical. However, ensuring such a consistency across an increasingly wider range of OTT devices used to access the available content is becoming a challenge to the OTT service providers. Therefore, a good Quality Assurance (QA) strategy includes testing the entire service along with associated components for a more in-depth analysis of their performance in different conditions including the last meters in the home, which are served with Wi-Fi.

The Wi-Fi console application 108 helps OTT providers track the Wi-Fi quality in the premises and further signals subscribers the recommendations using the insights/recommendations module 220. For instance, a collaboration app can recommend taking a different position before starting a session or recommend switching to another AP.

Furthermore, Wi-Fi will also be part of 5G and a key component in critical indoor 5G use cases, including the connected home. While 5G will support unlicensed and shared spectrum, Wi-Fi has been moving in the other direction, taking on many characteristics of cellular technologies such as enhanced QoS, security, and other features. As the lines between licensed and unlicensed spectrum blur, Wi-Fi will evolve alongside cellular and be part of the broader 5G platform, bringing 5G-like capabilities to non-spectrum owners such as cable operators, city authorities, or private network providers.

Densification is the practice of adding capacity and coverage in a targeted way by adding Wi-Fi or cellular small cells to the network. The cells can be mounted on street furniture, or deployed indoors, attached to an enterprise Ethernet connection. As attention moves from coverage to capacity, operators talk more commonly about heterogeneous networks (HetNets) which integrate any combination of cell sizes, base station configurations, and spectrum bands, including Wi-Fi and low-power wide-area networks (LPWANs) such as Long Range (LoRa).

Virtualization is a way for an operator to use their spectrum and capacity resources more efficiently and flexibly, as well as to reduce CAPEX and OPEX costs. For these reasons, operators are turning to architectures, which decouple the actual functions of the network from the hardware. Instead of deploying dedicated appliances to support functions (such as radio access or security gateways), they are implementing some or all network functions in software as virtual machines (VMs), which can run on off-the-shelf hardware, in local premises or switching centers, or in the cloud. The system creates tunnels between the VMs so that they can be reconfigured on-the-fly without affecting the whole system. This has already been implemented in some enterprises and carrier Wi-Fi systems. Some of these functions will also be available in a digital marketplace available for anyone to buy as they need instead of being deployed centrally by an operator.

In addition, many operators are moving to software-defined networks (SDNs). SDNs are programmable and highly flexible and separate the control and data planes, centralizing the control and orchestration of the huge number of VMs, and allocating resources such as storage and bandwidth dynamically wherever they are required. The network is fully programmable, using standard interfaces, common developer tools, and programmable APIs for adapting core network behavior in near-real time.

Figure 8:
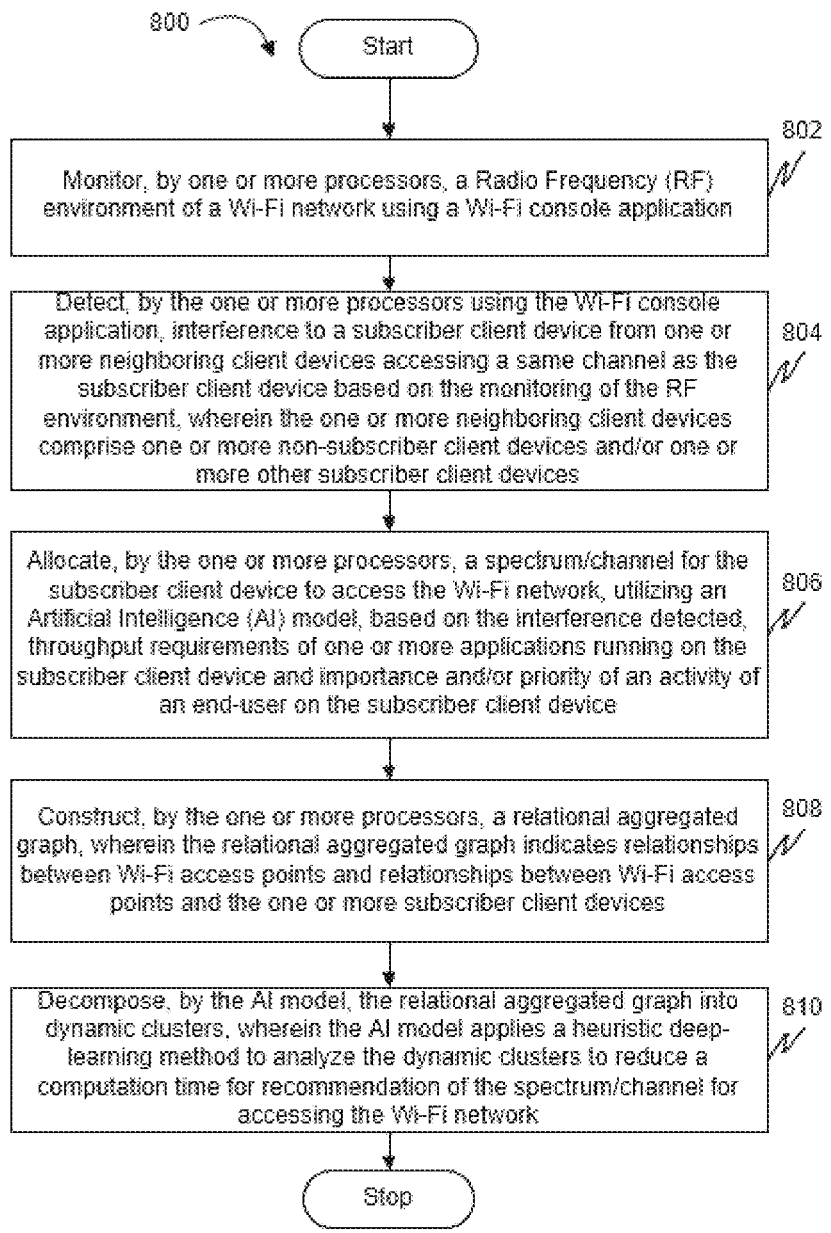
FIG. 8 is a flowchart that illustrates a method for optimizing utilization and performance of a Wi-Fi network for one or more subscriber client devices in accordance with an exemplary embodiment of the disclosure.

FIG. 8 is a flowchart that illustrates a method for optimizing utilization and performance of a Wi-Fi network for one or more subscriber client devices in accordance with an exemplary embodiment of the disclosure. Referring to FIG. 8, there is shown a flowchart 800 for optimizing utilization and performance of the Wi-Fi network 102 using the Wi-Fi console application 108.

At 802, monitor, by one or more processors, a Radio Frequency (RF) environment of a Wi-Fi network using a Wi-Fi console application. The RF monitoring module 208 is configured to monitor an RF environment of the Wi-Fi network 102.

At 804, detect, by the one or more processors using the Wi-Fi console application, interference to a subscriber client device from one or more neighboring client devices accessing a same channel as the subscriber client device based on the monitoring of the RF environment, wherein the one or more neighboring client devices comprise one or more non-subscriber client devices and/or one or more other subscriber client devices. The interference detection 210 is configured to detect interference to the subscriber client device 106A from neighboring client devices to the subscriber client device 106A accessing a same channel as the subscriber client device 106A, based on the monitoring of the RF environment by the RF monitoring module 208.

At 806, allocate, by the one or more processors, a spectrum/channel for the subscriber client device to access the Wi-Fi network, utilizing an Artificial Intelligence (AI) model, based on the interference detected, throughput requirements of one or more applications running on the subscriber client device and importance and/or priority of an activity of an end-user on the subscriber client device. The spectrum/channel allocation module 212 allocates a spectrum/channel allocation for the Wi-Fi network 102 using the AI model 214, for optimizing Wi-Fi access for the subscriber client device 106A based on the interference detected, throughput requirements of applications running on the subscriber client device 106A and importance/priority of user activity on the subscriber client device 106A.

At 808, construct, by the one or more processors, a relational aggregated graph, wherein the relational aggregated graph indicates relationships between Wi-Fi access points and relationships between Wi-Fi access points and the one or more subscriber client devices. The optimization module 216 is configured to enable the spectrum/channel allocation by creating a relational aggregated graph, using a smart band, channel, and transmit power allocation mechanism, to construct AP-to-AP and AP-to-device relations.

At 810, decompose, by the AI model, the relational aggregated graph into dynamic clusters, wherein the AI model applies a heuristic deep-learning method to analyze the dynamic clusters to reduce a computation time for recommendation of the spectrum/channel for accessing the Wi-Fi network. Using an AI-based solver of the AI model 214, the relational aggregated graph is decomposed into dynamic clusters and a heuristic deep-learning method is applied to reduce computation time of optimization for providing fast-switching recommendations for the right band or channel for accessing the Wi-Fi network 102.

The present disclosure is advantageous in that it provides a novel, device-centric approach to identify and solve Wi-Fi related problems. This approach is collaborative, empowering users to take their Wi-Fi destiny into their own hands and freeing up service providers from a complex and lengthy integration process. It is also a mobile-managed approach, combining both the power of cloud-based computing and AI with the simplicity and elegance of a device application. More importantly, it addresses and consolidates all sizes of Wi-Fi networks in a scalable way. Various features of the agile solution of the present disclosure benefit networks in various deployment scenarios for the home, hospitality, shopping malls, ISPs and OTTs.

Further, a system of the present disclosure provides a device-centric and collaborative mechanism as the only inter-home Wi-Fi performance solution in the market. It provides a substantial amount of flexibility that can optimize the Wi-Fi experience based on importance of user activity, such as, but not limited to, business calls, and online classrooms. This quality-enhancing solution can be used in high density regions, as well as other important locations, such as, but not limited to, hospitals, shopping malls, multi-story buildings, skyscrapers, and hotels.

Thus, the system of the present disclosure encourages both end users and operators to unleash the maximum potential of Wi-Fi and increase Internet speed, and offers a unique platform based on cloud and AI to bring order and dynamism to chaotic unlicensed spectrum among all sizes of Wi-Fi networks. The technology can reach hundreds of millions of access points to optimize the performance of Wi-Fi worldwide, and provide instant solutions for consumer, enterprise, and telco Wi-Fi users.

In addition, the system of the present disclosure is deployed on SDNs that are programmable and highly flexible. This enables new services to be launched and expanded (or dialed down) very quickly, according to usage patterns, avoiding the need for over-provisioning. It also makes it possible to integrate multiple networks on a fully flexible basis, allocating tasks to different connections as required, and treating all the networks as a common pool of capacity.

Further, since 6G networks will require more flexibility for software-driven modulation and ability to switch between radio frequencies without breaking a connection, the solution of the present disclosure introduces a standardized spectrum controller for spectrum orchestration in a dense network with hundreds of Wi-Fi and cellular access points, which is a key enabler of QoE.

Consequently, Wi-Fi is the most used technology to connect indoor, in the home, the office, and even in public spaces such as shopping malls. Unlicensed spectrum is of great economic value to society, but it comes with the price of uncertainty. When Wi-Fi performance is compromised, users become frustrated and look for ways to fix the problem. Generally, events in unlicensed bands lack visibility and is thus hard to prevent issues, as the user or operator is not aware of what they are looking for. In order to address this, the solution of the present disclosure introduces a Wi-Fi console as an inter-home Wi-Fi performance solution for all sizes of Wi-Fi networks fed by a remote-controlled Wi-Fi app that optimizes parameters to reduce the neighbor interference problem.

Also, the system of the present disclosure is compatible with Hotspot 2.0, where roaming is as easy as cellular roaming with Passpoint certified devices, and hence it can provide seamless and secure user experience making use of the encrypted radio transmission (Wi-Fi Protected Access 2 (WPA2)-enterprise) and Extensible Authentication Protocol (EAP)-based authentication.

Thus, the solution offered by the present disclosure enables smart monitoring and optimization of channel allocation that is location-aware and application-aware and lends itself to a collaborative approach and is positioned to deliver virtualized functions empowering consumers to select their own 5G applications on demand with Wi-Fi spectrum orchestration as a service. Further, users can be better informed and can find a solution to their Wi-Fi related issues without frustration, and companies can reduce call center costs and increase profit margins with more satisfied customers.

A system 200 of the present disclosure comprises a memory 202 and a processor 204 communicatively coupled to the memory 202. The processor 204 is configured to monitor a Radio Frequency (RF) environment of a Wi-Fi network 102 using a Wi-Fi console application 108, wherein the Wi-Fi network is accessed by one or more subscriber client devices 106A-106N, wherein a subscriber client device accesses the Wi-Fi network 102 through a Wi-Fi access point operating on a channel, each subscriber client device of the one or more subscriber client devices 106A-106N associated with an end-user, wherein the Wi-Fi console application 108 runs on the one or more subscriber client devices 106A-106N and communicates with a cloud processor on a cloud platform 114.

The processor 204 is configured to detect, using the Wi-Fi console application 108, interference to a subscriber client device 106A from one or more neighboring client devices accessing a same channel as the subscriber client device 106A based on the monitoring of the RF environment, wherein the one or more neighboring client devices comprise one or more non-subscriber client devices 110A-110N and/or one or more other subscriber client devices. A spectrum/channel is allocated for the subscriber client device 106A to access the Wi-Fi network 102, utilizing an Artificial Intelligence (AI) model 214 of the Wi-Fi console application 108, based on the interference detected, throughput requirements of one or more applications running on the subscriber client device 106A and importance and/or priority of an activity of an end-user on the subscriber client device 106A. The processor 204 is configured to construct a relational aggregated graph, wherein the relational aggregated graph indicates relationships between Wi-Fi access points and relationships between Wi-Fi access points and the one or more subscriber client devices 106A-106N and decompose, by the AI model 214, the relational aggregated graph into dynamic clusters, wherein the AI model 214 applies a heuristic deep-learning method to analyze the dynamic clusters to reduce a computation time for recommendation of the spectrum/channel for accessing the Wi-Fi network 102.

The processor is further configured to perform channel scanning by the subscriber client device 106A using the Wi-Fi console application 108 by switching to each channel one by one and detect one or more Wi-Fi access points operating on the same channel as the subscriber client device 106A, and determine the interference based on a formulation of signal-to-noise ratio (SNR) and signal-to-interference plus noise ratio (SINR) and comparing the level of Wi-Fi signals from the one or more Wi-Fi access points to a level of interfering signals from the one or more neighboring client devices.

The Wi-Fi console application 108 acts as a broker for a plurality of Wi-Fi networks, each Wi-Fi network of the plurality of Wi-Fi networks under a different ownership, and wherein the Wi-Fi console application 108 manages spectrum and transmit power allocation using a heat map constructed on a subscriber client device based on information pertaining to one or more other subscriber client devices.

The processor 204 is further configured to provide, by the AI model 214, one or more insights and/or recommendations on a dashboard of a subscriber client device through the Wi-Fi console application 108 using appropriate Application Programming Interfaces (APIs) based on evaluating a Quality of Experience (QoE) of an end-user of the subscriber client device. The one or more insights and/or recommendations comprise at least one of Wi-Fi coverage, suitable placement of Wi-Fi access points based on at least one of Received Signal Strength Indicator (RSSI) and/or interference from the one or more neighboring client devices, a number of end-users using a Wi-Fi network, throughput requirements of currently active applications on a subscriber client device, frequencies and locations of one or more blind spots, wherein a blind spot is a location in a building where it is not possible to connect to a Wi-Fi access point, or where a Wi-Fi access point can be connected to only at very low speeds, a view of how guest users engage with a Wi-Fi network, a number of end-users connected to a single Wi-Fi access point, the distribution of end-users between different Wi-Fi access points, and a specific area end-users connect from to a Wi-Fi access point.

The processor 204 is further configured to combine information on usage patterns associated with an end-user's digital experience and performance data to determine information on Wi-Fi signal coverage and interference distribution for each floor/room/space on an end-user's site, wherein the end-user is enabled to address interference and congestion issues ahead of time and obtain a realistic view of a number of Wi-Fi access points required and placement of the Wi-Fi access points to obtain high-performing Wi-Fi.

The processor 204 is further configured to provide different Quality of Service (QoS) parameters/levels to different end-users through media prioritization, wherein a subscriber client device associated with an end-user may be set at a specific bandwidth allocation level.

The processor 204 is further configured to provide Internet Service Providers (ISPs) a view of a network environment and digital experiences of end-users who are subscribers to the ISPs, wherein the ISPs are enabled to monitor at least one of traffic flow during peak times, applications used by the subscribers and QoS/QoE metrics obtained for a single subscriber, or all subscribers, in a given region or globally through geolocation maps.

The processor 204 is further configured to provide QoE scoring for an end-user based on daily/weekly performance for an individual subscriber or for a group of subscribers.

The processor 204 is further configured to perform load balancing among different frequency bands and Wi-Fi access points by enabling an end-user, through the Wi-Fi console application 108 to automatically adjust an operating band or a frequency of a corresponding subscriber client device based on at least one of data requirements of the subscriber client device, a distance of the subscriber client device from a Wi-Fi access point and performance pertaining to the end-user of the subscriber client device.

The processor 204 is further configured to configure, using the Wi-Fi console application 108, the one or more subscriber client devices 106A-106N to act as motion sensors to perform motion analysis to detect expected and unexpected in-home movement, wherein an end-user is enabled to customize settings on the Wi-Fi console application 108 to view which room in the home the motion is occurring in, to notice when family members or guests arrive in the home, to automatically activate and deactivate the motion analysis and/or to automatically deactivate the one or more subscriber client devices 106A-106N from being used as motion sensors.

The processor 204 is further configured to enable ad-hoc Wi-Fi sharing and offloading from a licensed spectrum to an unlicensed spectrum both for a Wi-Fi operator and an end-user, wherein the AI model is configured to determine whether the offloading is desirable or not based on parameters comprising at least one of Wi-Fi interference, number of active users, licensed spectrum status, costs, guest characteristics, and RSSI.

The processor 204 is further configured to track bottlenecks in the path of a Wi-Fi network and performing Border Gateway Protocol (BGP)/Multiprotocol Label Switching (MPLS) troubleshooting at an end-user's end, wherein the BGP/MPLS troubleshooting comprises ensuring the prefix propagation is across the Wi-Fi network, classifying IP blocks and benchmarking the hops by grouping end-users.

The processor 204 is further configured to derive, using the AI model 214, key characteristics of problems and root causes of performance issues in the Wi-Fi network based on analyzing traffic data in the Wi-Fi network, identifying behavior of end-users and classifying the behavior into well-known troubleshoot problems using support vector machines in the AI model, wherein the troubleshoot problems include at least one of dead spots, weak signals, outdated equipment, faulty installation, and backhaul problems, recording abnormal behavior of connected subscriber client devices comprising recording subscriber client device-specific connection issues, frequent log in and log outs, power cutoffs, and Wi-Fi access point/router restarts, and performing periodic channel scanning to detect any vague non-subscriber client device in the vicinity.

The processor 204 is further configured to fix problems of the Wi-Fi network directly using deep learning in the AI model 214, to flag conditions for immediate action, analyze trends in performance of the Wi-Fi network, predict requirements to avoid problems in the Wi-Fi network in future, constantly add to a knowledge base and extend its repertoire of known problems and solutions, and predict issues related to the Wi-Fi network, infrastructure and the one or more subscriber client devices before operations of ISPs are affected and issue corresponding tickets to a network team along with potential troubleshooting guidelines.

The processor 204 is further configured to perform, using the Wi-Fi console application 108, on-demand testing to help an end-user manage/tune a Wi-Fi network infrastructure for better network performance during specific events to avoid congestion and support connectivity.

The processor 204 is further configured to enable, using the Wi-Fi console application 108, a network team to assess deployment requirements, including monitoring the RF environment, and coordinating between technicians in the network team and end-users for installation of a home gateway.

The processor 204 is further configured to implement multi-threaded programming in case end-users have two or more Wi-Fi access points to be connected, to minimize processing time in the analysis phase of an application, wherein AsyncTask class is used to manage waiting processes of threads that work concurrently and require results of an earlier thread(s) to terminate.

The processor 204 is further configured to assess performance of a plurality of Wi-Fi access points and assigning a rating to each Wi-Fi access point based on the performance, wherein a rating enables a subscriber client device to connect to a Wi-Fi access point that provides a best connection.

The processor 204 is further configured to provide one or more alerts to an end-user via the Wi-Fi console application 108 regarding when to switch between a cellular network and a Wi-Fi network, or when to upgrade application services/operating systems, based on a level of experience of the end-user.

The processor 204 is further configured to provide backup and restoration services to an end-user seeking backups of key historical user data on network/infrastructure elements, wherein the historical user data comprises at least one of specific location of Wi-Fi access points, their SSID names, coverages, interference information per Wi-Fi access point, historical data regarding the infrastructure, historical traffic flow and consumption, past network diagnoses and processes, wherein a backup is updated on an hourly/daily/weekly/monthly basis depending on the end-user's needs and is used for recovering data after an incident.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A method, comprising:
monitoring, by one or more processors, a Radio Frequency (RF) environment of a Wi-Fi network using a Wireless-Fidelity (Wi-Fi) console application, wherein the Wi-Fi network is accessed by one or more subscriber client devices, wherein a subscriber client device accesses the Wi-Fi network through a Wi-Fi access point operating on a channel, each subscriber client device of the one or more subscriber client devices associated with an end-user, wherein the Wi-Fi console application runs on the one or more subscriber client devices and communicates with a cloud processor on a cloud platform;
detecting, by the one or more processors using the Wi-Fi console application, interference to a subscriber client device from one or more neighboring client devices accessing a same channel as the subscriber client device based on the monitoring of the RF environment, wherein the one or more neighboring client devices comprise one or more non-subscriber client devices and/or one or more other subscriber client devices; and
allocating, by the one or more processors, a channel for the subscriber client device to access the Wi-Fi network, utilizing an Artificial Intelligence (AI) model of the Wi-Fi console application, based on the interference detected, throughput requirements of one or more applications running on the subscriber client device and importance and/or priority of an activity of the end-user on the subscriber client device, wherein the allocating comprises:
constructing, by the one or more processors, a relational aggregated graph, wherein the relational aggregated graph indicates relationships between Wi-Fi access points and relationships between Wi-Fi access points and the one or more subscriber client devices; and
decomposing, by the AI model, the relational aggregated graph into dynamic clusters, wherein the AI model applies a heuristic deep-learning method to analyze the dynamic clusters to reduce a computation time for recommendation of the channel for accessing the Wi-Fi network.

2. The method of claim 1, wherein the detecting further comprises performing channel scanning by the subscriber client device using the Wi-Fi console application by switching to each channel one by one and detecting one or more Wi-Fi access points operating on the same channel as the subscriber client device, and determining the interference based on a formulation of signal-to-noise ratio (SNR) and signal-to-interference plus noise ratio (SINR) and comparing the level of Wi-Fi signals from the one or more Wi-Fi access points to a level of interfering signals from the one or more neighboring client devices.

3. The method of claim 1, wherein the Wi-Fi console application acts as a broker for a plurality of Wi-Fi networks, each Wi-Fi network of the plurality of Wi-Fi networks under a different ownership, and wherein the Wi-Fi console application manages spectrum and transmit power allocation using a heat map constructed on the subscriber client device based on information pertaining to one or more other subscriber client devices.

4. The method of claim 1, further comprising providing, by the AI model, one or more insights and/or recommendations on a dashboard of the subscriber client device through the Wi-Fi console application using appropriate Application Programming Interfaces (APIs) based on evaluating a Quality of Experience (QoE) of the end-user of the subscriber client device.

5. The method of claim 4, wherein the one or more insights and/or recommendations comprise at least one of Wi-Fi coverage, suitable placement of Wi-Fi access points based on at least one of Received Signal Strength Indicator (RSSI) and/or interference from the one or more neighboring client devices, a number of end-users using the Wi-Fi network, throughput requirements of currently active applications on the subscriber client device, frequencies and locations of one or more blind spots, wherein a blind spot is a location in a building where it is not possible to connect to a Wi-Fi access point, or where a Wi-Fi access point can be connected to only at very low speeds, a view of how guest users engage with the Wi-Fi network, a number of end-users connected to a single Wi-Fi access point, the distribution of end-users between different Wi-Fi access points, and a specific area end-users connect from to a Wi-Fi access point.

6. The method of claim 1, further comprising combining, by the one or more processors, information on usage patterns associated with the end-user's digital experience and performance data to determine information on Wi-Fi signal coverage and interference distribution for each floor, room or space on the end-user's site, wherein the end-user is enabled to address interference and congestion issues ahead of time and obtain a realistic view of a number of Wi-Fi access points required and placement of the Wi-Fi access points to obtain high-performing Wi-Fi.

7. The method of claim 1, further comprising providing, by the one or more processors, different Quality of Service (QoS) parameters or levels to different end-users through media prioritization, wherein the subscriber client device associated with the end-user may be set at a specific bandwidth allocation level.

8. The method of claim 1, further comprising providing, by the one or more processors, Internet Service Providers (ISPs) a view of a network environment and digital experiences of end-users who are subscribers to the ISPs, wherein the ISPs are enabled to monitor at least one of traffic flow during peak times, applications used by the subscribers and QoS or QoE metrics obtained for a single subscriber, or all subscribers, in a given region or globally through geo-location maps.

9. The method of claim 8, further comprising providing, by the one or more processors, QoE scoring for the end-user based on daily or weekly performance for an individual subscriber or for a group of subscribers.

10. The method of claim 1, further comprising performing, by the one or more processors, load balancing among different frequency bands and Wi-Fi access points by enabling the end-user, through the Wi-Fi console application to automatically adjust an operating band or a frequency of a corresponding subscriber client device based on at least one of data requirements of the subscriber client device, a distance of the subscriber client device from a Wi-Fi access point and performance pertaining to the end-user of the subscriber client device.

11. The method of claim 1, further comprising configuring, using the Wi-Fi console application, the one or more subscriber client devices to act as motion sensors to perform motion analysis to detect expected and unexpected in-home movement, wherein the end-user is enabled to customize settings on the Wi-Fi console application to view which room in the home the motion is occurring in, to notice when family members or guests arrive in the home, to automatically activate and deactivate the motion analysis and/or to automatically deactivate the one or more subscriber client devices from being used as motion sensors.

12. The method of claim 1, further comprising enabling, by the one or more processors, ad-hoc Wi-Fi sharing and offloading from a licensed spectrum to an unlicensed spectrum both for a Wi-Fi operator and the end-user, wherein the AI model is configured to determine whether the offloading is desirable or not based on parameters comprising at least one of Wi-Fi interference, number of active users, licensed spectrum status, costs, guest characteristics, and RSSI.

13. The method of claim 1, further comprising tracking, by the one or more processors, bottlenecks in the path of the Wi-Fi network and performing Border Gateway Protocol (BGP)/Multiprotocol Label Switching (MPLS) troubleshooting at the end-user's end, wherein the BGP/MPLS troubleshooting comprises ensuring the prefix propagation is across the Wi-Fi network, classifying IP blocks and bench-marking the hops by grouping end-users.

14. The method of claim 13, wherein the tracking of the bottlenecks further comprises deriving, using the AI model, key characteristics of problems and root causes of performance issues in the Wi-Fi network based on analyzing traffic data in the Wi-Fi network, identifying behavior of end-users and classifying the behavior into well-known troubleshoot problems using support vector machines in the AI model, wherein the troubleshoot problems include at least one of dead spots, weak signals, outdated equipment, faulty installation, and backhaul problems, recording abnormal behavior of connected subscriber client devices comprising recording subscriber client device-specific connection issues, frequent log in and log outs, power cutoffs, and Wi-Fi access point or router restarts, and performing periodic channel scanning to detect any vague non-subscriber client device in the vicinity.

15. The method of claim 14, further comprising fixing problems of the Wi-Fi network directly using deep learning in the AI model, to flag conditions for immediate action, analyzing trends in performance of the Wi-Fi network, predicting requirements to avoid problems in the Wi-Fi network in future, constantly adding to a knowledge base and extending its repertoire of known problems and solutions, and predicting issues related to the Wi-Fi network, infrastructure and the one or more subscriber client devices before operations of ISPs are affected and issuing corresponding tickets to a network team along with potential troubleshooting guidelines.

16. The method of claim 15, further comprising performing, using the Wi-Fi console application, on-demand testing to help the end-user to manage and tune a Wi-Fi network infrastructure for better network performance during specific events to avoid congestion and support connectivity.

17. The method of claim 15, further comprising enabling, using the Wi-Fi console application, a network team to assess deployment requirements, including monitoring the RF environment, and coordinating between technicians in the network team and end-users for installation of a home gateway.

18. The method of claim 1, further comprising implementing, by the one or more processors, multi-threaded programming in case end-users have two or more Wi-Fi access points to be connected, to minimize processing time in the analysis phase of an application, wherein AsyncTask class is used to manage waiting processes of threads that work concurrently and require results of an earlier thread(s) to terminate.

19. The method of claim 1, further comprising assessing, by the one or more processors, performance of a plurality of Wi-Fi access points and assigning a rating to each Wi-Fi access point based on the performance, wherein a rating enables the subscriber client device to connect to a Wi-Fi access point that provides a best connection.

20. The method of claim 19, further comprising providing, by the one or more processors, one or more alerts to the end-user via the Wi-Fi console application regarding when to switch between a cellular network and the Wi-Fi network, or when to upgrade application services and operating systems, based on a level of experience of the end-user.

21. The method of claim 1, further comprising providing, by the one or more processors, backup and restoration services to the end-user seeking backups of key historical user data on network and infrastructure elements, wherein the historical user data comprises at least one of specific location of Wi-Fi access points, their SSID names, coverages, interference information per Wi-Fi access point, historical data regarding the infrastructure, historical traffic flow and consumption, past network diagnoses and processes, wherein a backup is updated on an hourly, daily, weekly or monthly basis depending on the end-user's needs and is used for recovering data after an incident.

22. A system, comprising:
a memory;
a processor communicatively coupled to the memory, wherein the processor is configured to:
monitor a Radio Frequency (RF) environment of a Wi-Fi network by a Wi-Fi console application, wherein the Wi-Fi network is accessed by one or more subscriber client devices, wherein a subscriber client device accesses the Wi-Fi network through a Wi-Fi access point that operates on a channel, each subscriber client device of the one or more subscriber client devices associated with an end-user, wherein the Wi-Fi console application runs on the one or more subscriber client devices and communicates with a cloud processor on a cloud platform;
detect, by the Wi-Fi console application, interference to the subscriber client device from one or more neighboring client devices that accesses a same channel as the subscriber client device based on the monitored RF environment, wherein the one or more neighboring client devices comprise one or more non-subscriber client devices and/or one or more other subscriber client devices; and
allocate a channel for the subscriber client device to access the Wi-Fi network, by an Artificial Intelligence (AI) model of the Wi-Fi console application, based on the interference detected, throughput requirements of one or more applications that run on the subscriber client device and importance and/or priority of an activity of the end-user on the subscriber client device, wherein the processor is further configured to:
construct a relational aggregated graph, wherein the relational aggregated graph indicates relationships between Wi-Fi access points and relationships between Wi-Fi access points and the one or more subscriber client devices; and
decompose, by the AI model, the relational aggregated graph into dynamic clusters, wherein the AI model applies a heuristic deep-learning operation to analyze the dynamic clusters to reduce a computation time for recommendation of the channel to access the Wi-Fi network.

23. The system of claim 22, wherein the processor is further configured to scan channels by the subscriber client device by the Wi-Fi console application, wherein the subscriber client device switches to each channel one by one and detects one or more Wi-Fi access points that operate on the same channel as the subscriber client device, and determine the interference based on a formulation of signal-to-noise ratio (SNR) and signal-to-interference plus noise ratio (SINR) and compare the level of Wi-Fi signals from the one or more Wi-Fi access points to a level of interfering signals from the one or more neighboring client devices.

24. The system of claim 22, wherein the Wi-Fi console application acts as a broker for a plurality of Wi-Fi networks, each Wi-Fi network of the plurality of Wi-Fi networks under a different ownership, and wherein the Wi-Fi console application manages spectrum and transmit power allocation on a heat map constructed on the subscriber client device based on information pertaining to one or more other subscriber client devices.

25. The system of claim 22, wherein the processor is further configured to provide, by the AI model, one or more insights and/or recommendations on a dashboard of the subscriber client device through the Wi-Fi console application by one or more Application Programming Interfaces (APIs) based on an evaluated Quality of Experience (QoE) of the end-user of the subscriber client device.

26. The system of claim 25, wherein the one or more insights and/or recommendations comprise at least one of Wi-Fi coverage, suitable placement of Wi-Fi access points based on at least one of Received Signal Strength Indicator (RSSI) and/or interference from the one or more neighboring client devices, a number of end-users that use the Wi-Fi network, throughput requirements of currently active applications on the subscriber client device, frequencies and locations of one or more blind spots, wherein a blind spot is a location in a building where it is not possible to connect to a Wi-Fi access point, or where a Wi-Fi access point can be connected to only at very low speeds, a view of how guest users engage with the Wi-Fi network, a number of end-users connected to a single Wi-Fi access point, the distribution of end-users between different Wi-Fi access points, and a specific area end-users connect from to a Wi-Fi access point.

27. The system of claim 22, wherein the processor is further configured to combine information on usage patterns associated with an end-user's digital experience and performance data to determine information on Wi-Fi signal coverage and interference distribution for each floor, room or space on an end-user's site, wherein the end-user is enabled to address interference and congestion issues ahead of time and obtain a realistic view of a number of Wi-Fi access points required and placement of the Wi-Fi access points to obtain high-performing Wi-Fi.

28. The system of claim 22, wherein the processor is further configured to provide different Quality of Service (QoS) parameters or levels to different end-users through media prioritization, wherein the subscriber client device associated with the end-user may be set at a specific bandwidth allocation level.

29. The system of claim 22, wherein the processor is further configured to provide Internet Service Providers (ISPs) a view of a network environment and digital experiences of end-users who are subscribers to the ISPs, wherein the ISPs are enabled to monitor at least one of traffic flow during peak times, applications used by the subscribers and QoS or QoE metrics obtained for a single subscriber, or all subscribers, in a given region or globally through geolocation maps.

30. The system of claim 29, wherein the processor is further configured to provide QoE scores for the end-user based on daily or weekly performance for an individual subscriber or for a group of subscribers.

31. The system of claim 22, wherein the processor is further configured to perform load balancing operations among different frequency bands and Wi-Fi access points, wherein the end-user is enabled, through the Wi-Fi console application to automatically adjust an operating band or a frequency of a corresponding subscriber client device based on at least one of data requirements of the subscriber client device, a distance of the subscriber client device from a Wi-Fi access point and performance pertaining to the end-user of the subscriber client device.

32. The system of claim 22, wherein the processor is further configured to configure, by the Wi-Fi console application, the one or more subscriber client devices to act as motion sensors to perform motion analysis to detect expected and unexpected in-home movement, wherein the end-user is enabled to customize settings on the Wi-Fi console application to view which room in the home the motion is occurring in, to notice when family members or guests arrive in the home, to automatically activate and deactivate the motion analysis and/or to automatically deactivate the one or more subscriber client devices from being used as motion sensors.

33. The system of claim 22, wherein the processor is further configured to enable an ad-hoc Wi-Fi sharing operation and an offloading operation from a licensed spectrum to an unlicensed spectrum both for a Wi-Fi operator and the end-user, wherein the AI model determines whether the offloading operation is desirable or not based on parameters comprising at least one of Wi-Fi interference, number of active users, licensed spectrum status, costs, guest characteristics, and RSSI.

34. The system of claim 22, wherein the processor is further configured to track bottlenecks in the path of the Wi-Fi network and perform Border Gateway Protocol (BGP)/Multiprotocol Label Switching (MPLS) troubleshooting at an end-user's end, wherein the BGP/MPLS troubleshooting ensures the prefix propagation is across the Wi-Fi network, classifies IP blocks and benchmarks hops by grouping end-users.

35. The system of claim 34, wherein the processor is further configured to derive, by the AI model, key characteristics of problems and root causes of performance issues in the Wi-Fi network based on analysis of traffic data in the Wi-Fi network, identify behavior of end-users and classify the behavior into well-known troubleshoot problems by support vector machines in the AI model, wherein the troubleshoot problems comprise at least one of dead spots, weak signals, outdated equipment, faulty installation, and backhaul problems, record abnormal behavior of connected subscriber client devices subscriber client device-specific connection issues, frequent log in and log outs, power cutoffs, and Wi-Fi access point or router restarts, and perform periodic scans of channels to detect any vague non-subscriber client device in the vicinity.

36. The system of claim 35, wherein the processor is further configured to fix problems of the Wi-Fi network directly by deep learning operations in the AI model, to flag conditions for immediate action, analyze trends in performance of the Wi-Fi network, predict requirements to avoid problems in the Wi-Fi network in future, constantly add to a knowledge base and extend its repertoire of known problems and solutions, and predict issues related to the Wi-Fi network, infrastructure and the one or more subscriber client devices before operations of ISPs are affected and issue corresponding tickets to a network team along with potential troubleshooting guidelines.

37. The system of claim 36, wherein the processor is further configured to perform, by the Wi-Fi console application, on-demand testing operations to help the end-user manage and tune a Wi-Fi network infrastructure for better network performance during specific events to avoid congestion and support connectivity.

38. The system of claim 36, wherein the processor is further configured to enable, by the Wi-Fi console application, a network team to assess deployment requirements, monitor the RF environment, and coordinate between technicians in the network team and end-users for installation of a home gateway.

39. The system of claim 22, wherein the processor is further configured to implement multi-threaded programming operations in case end-users have two or more Wi-Fi access points to be connected, to minimize processing time in the analysis phase of an application, wherein AsyncTask class is used to manage waiting processes of threads that work concurrently and require results of an earlier thread(s) to terminate.

40. The system of claim 22, wherein the processor is further configured to assess performance of a plurality of Wi-Fi access points and assign a rating to each Wi-Fi access point based on the performance, wherein a rating enables the subscriber client device to connect to a Wi-Fi access point that provides a best connection.

41. The system of claim 40, wherein the processor is further configured to provide one or more alerts to the end-user via the Wi-Fi console application regarding when to switch between a cellular network and the Wi-Fi network, or when to upgrade application services and operating systems, based on a level of experience of the end-user.

42. The system of claim 22, wherein the processor is further configured to provide backup and restoration services to an end-user seeking backups of key historical user data on network and infrastructure elements, wherein the historical user data comprises at least one of specific location of Wi-Fi access points, their SSID names, coverages, interference information per Wi-Fi access point, historical data regarding the infrastructure, historical traffic flow and consumption, past network diagnoses and processes, wherein a backup is updated on an hourly, daily, weekly or monthly basis depending on the end-user's needs and is used for recovering data after an incident.

* * * * *